US009857180B2

(12) United States Patent
Dicke

(10) Patent No.: US 9,857,180 B2
(45) Date of Patent: Jan. 2, 2018

(54) SYSTEM AND METHOD FOR DISPLAYING ADDRESS INFORMATION ON A MAP

(71) Applicant: BlackBerry Limited, Waterloo (CA)

(72) Inventor: Ronald Anthony Dicke, Ottawa (CA)

(73) Assignee: BlackBerry Limited, Waterloo (CA)

(*) Notice: Subject to any disclaimer, the term of this patent is extended or adjusted under 35 U.S.C. 154(b) by 0 days.

(21) Appl. No.: 15/237,215

(22) Filed: Aug. 15, 2016

(65) Prior Publication Data

US 2016/0356607 A1  Dec. 8, 2016

Related U.S. Application Data

(63) Continuation of application No. 14/746,220, filed on Jun. 22, 2015, now Pat. No. 9,417,077, which is a continuation of application No. 14/220,217, filed on Mar. 20, 2014, now Pat. No. 9,074,900, which is a continuation of application No. 13/912,257, filed on Jun. 7, 2013, now Pat. No. 8,682,579, which is a continuation of application No. 11/936,455, filed on Nov. 7, 2007, now Pat. No. 8,463,424.

(51) Int. Cl.
*G01C 21/30* (2006.01)
*G01C 21/26* (2006.01)
*G01S 19/13* (2010.01)

(52) U.S. Cl.
CPC .............. *G01C 21/26* (2013.01); *G01C 21/30* (2013.01); *G01S 19/13* (2013.01)

(58) Field of Classification Search
CPC ................................ G01C 21/26; G01S 19/13
See application file for complete search history.

(56) References Cited

U.S. PATENT DOCUMENTS

| 6,859,721 | B1 | 2/2005 | Runquist et al. | |
|---|---|---|---|---|
| 7,076,505 | B2 | 7/2006 | Campbell | |
| 2004/0008225 | A1* | 1/2004 | Campbell | G01C 21/367 715/764 |
| 2004/0113904 | A1* | 6/2004 | Nakamura | G09G 5/363 345/204 |
| 2005/0251331 | A1 | 11/2005 | Kreft | |
| 2006/0074553 | A1 | 4/2006 | Foo et al. | |
| 2006/0287815 | A1 | 12/2006 | Gluck | |

(Continued)

FOREIGN PATENT DOCUMENTS

| EP | 0779498 A2 | 6/1997 |
|---|---|---|
| EP | 1798522 A1 | 6/2007 |

(Continued)

OTHER PUBLICATIONS

Garmin StreetPilot c300, Online Review, accessed via Wayback Machine Internet Archive at https://web.archive.org/web/20071022170625/https://buy.garmin.com/shop/shop.do?cID=134&pID=6385, dated Oct. 22, 2007.

*Primary Examiner* — Ian Jen
(74) *Attorney, Agent, or Firm* — Moffat & Co.

(57) ABSTRACT

A method of displaying a map on a device includes determining position information of a position on the map, displaying a graphical position indicator representing the position on the map, determining address information corresponding to the position on the map, and presenting the address information via a user interface of the device by displaying a street number on the map adjacent to the graphical position indicator.

17 Claims, 15 Drawing Sheets

(56) References Cited

U.S. PATENT DOCUMENTS

| | | | | |
|---|---|---|---|---|
| 2007/0229549 A1* | 10/2007 | Dicke | ................... | G01C 21/362 345/676 |
| 2007/0233385 A1* | 10/2007 | Dicke | ................ | G01C 21/3667 715/864 |
| 2007/0233695 A1* | 10/2007 | Boudreau | ............... | G01C 21/20 |
| 2007/0233817 A1* | 10/2007 | Johnson | ............... | G01C 21/005 709/219 |
| 2008/0176545 A1* | 7/2008 | Dicke | ................... | G01C 21/362 455/418 |
| 2009/0119009 A1* | 5/2009 | Dicke | .................... | G01C 21/30 701/533 |
| 2009/0125228 A1* | 5/2009 | Dicke | ................. | G01C 21/3438 701/533 |
| 2009/0181650 A1* | 7/2009 | Dicke | .................... | G01C 21/32 455/414.1 |
| 2009/0182500 A1* | 7/2009 | Dicke | .................... | G01C 21/32 701/532 |
| 2010/0082235 A1* | 4/2010 | Dicke | ................. | G01C 21/3446 701/467 |
| 2010/0123737 A1* | 5/2010 | Williamson | ....... | G01C 21/3647 345/672 |
| 2010/0222996 A1* | 9/2010 | Weiland | ................. | G01C 21/20 701/532 |
| 2010/0277367 A1* | 11/2010 | Dicke | ...................... | G01S 19/34 342/357.74 |
| 2010/0279706 A1* | 11/2010 | Dicke | ............... | H04M 1/72572 455/456.1 |
| 2010/0279710 A1* | 11/2010 | Dicke | .................... | H04W 4/02 455/456.3 |
| 2010/0279712 A1* | 11/2010 | Dicke | .................... | H04W 4/02 455/456.5 |
| 2010/0281057 A1* | 11/2010 | Dicke | ................. | G06F 17/2765 707/780 |
| 2012/0016774 A1* | 1/2012 | Dicke | .................... | G06Q 30/06 705/27.1 |
| 2014/0282480 A1 | 9/2014 | Matthew | | |

FOREIGN PATENT DOCUMENTS

| | | |
|---|---|---|
| EP | 1840523 A1 | 10/2007 |
| JP | 2006275915 A | 12/2006 |
| WO | 2004008172 A1 | 1/2004 |

* cited by examiner

| Address A0 | (Latitude A0, Longitude A0) |
| Address A1 | (Latitude A1, Longitude A1) |
| Address A2 | (Latitude A2, Longitude A2) |

| Address AN-1 | (Latitude AN-1, Longitude AN-1) |
| Address AN | (Latitude AN, Longitude AN) |

…

SYSTEM AND METHOD FOR DISPLAYING ADDRESS INFORMATION ON A MAP

CROSS-REFERENCE TO RELATED APPLICATIONS

This application is a continuation of U.S. patent application Ser. No. 14/746,220, which is a continuation of U.S. patent application Ser. No. 14/220,217, which issued as U.S. Pat. No. 9,074,900 on Jul. 7, 2015, which is a continuation of U.S. patent application Ser. No. 13/912,257 which issued on Mar. 25, 2014 as U.S. Pat. No. 8,682,579, which is a continuation of U.S. patent application Ser. No. 11/936,455 which issued on Jun. 11, 2013 as U.S. Pat. No. 8,463,424, the entire disclosures of which are hereby incorporated by reference for all purpose.

TECHNICAL FIELD

The present disclosure relates generally to wireless communications devices and, in particular, to mapping techniques on wireless communications devices.

BACKGROUND

Wireless communications devices such as the BlackBerry® by Research in Motion Limited provide a variety of useful functions, such as voice communication, e-mail and Web browsing. Of growing popularity are mapping applications that take advantage of the device's wireless link and Web capabilities to download and render maps on the device. When coupled with a GPS receiver, either embedded as a GPS chipset or externally (e.g. Bluetoothm connected), these mapping applications can be used for (or modified for use with) navigation and other location-based services (LBS).

Navigation technology, be it on dedicated GPS navigation units or on multi-function wireless handheld devices, has evolved rapidly in recent years from providing a graphical representation of a route superimposed on a map and/or a list of driving directions to full-blown turn-by-turn navigation where real-time instructions are presented to the user visually and/or audibly (using text-to-speech technology). In addition to current position and route information, current mapping and navigation software often provide searchable databases of points of interest (POI) such as landmarks, hotels, restaurants, cafes, gas stations, etc., which the user can optionally have displayed on the map. These POI can be either stored in onboard memory or retrieved wirelessly on-demand from a map server. Although street names and points of interest help a user navigate, it would be highly desirable to provide more detail about the device's current position to further facilitate navigation.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
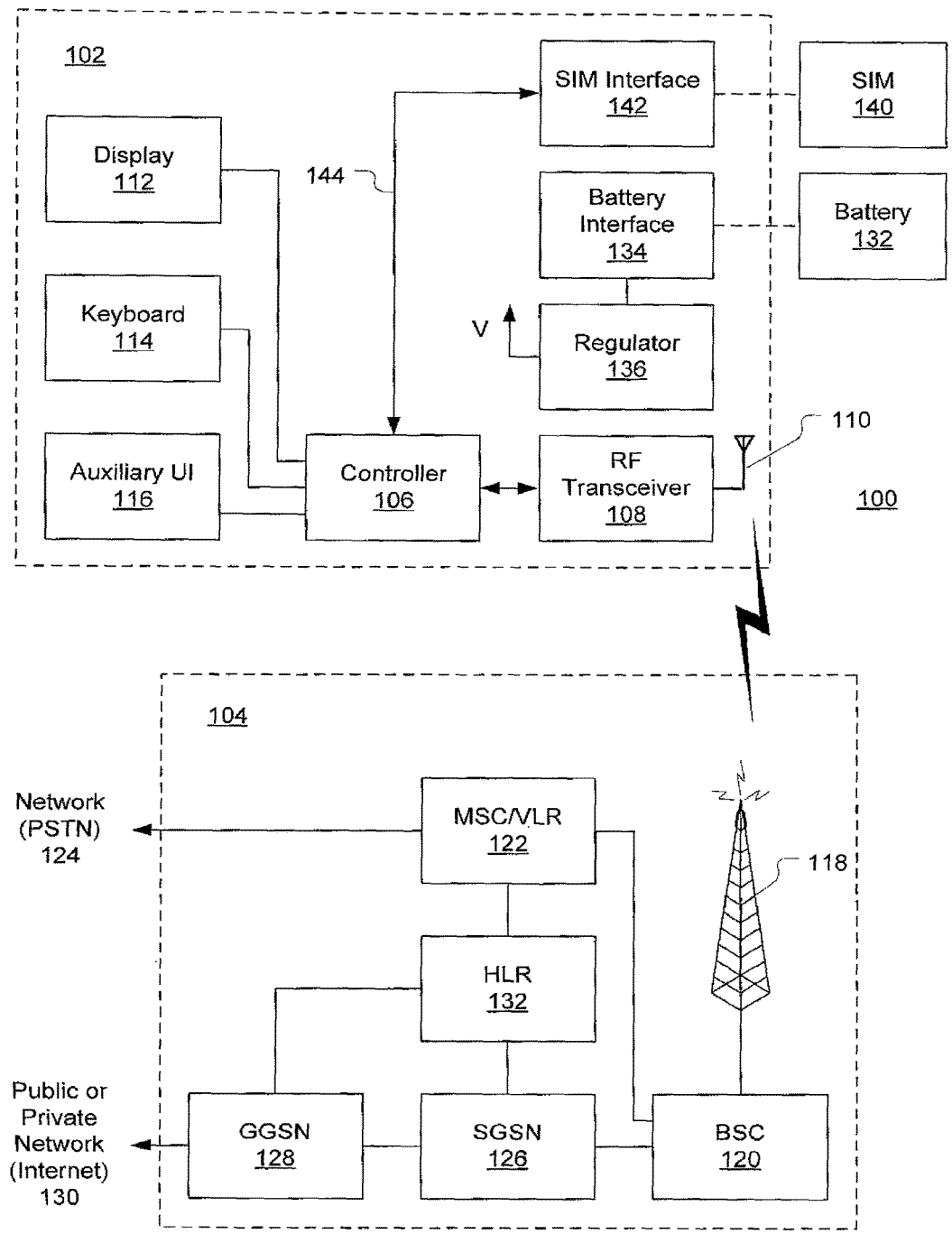
FIG. 1 is a block diagram schematically illustrating pertinent components of an exemplary wireless communications device and of an exemplary wireless communications network.

The present technology addresses a technical problem recognized by the applicant regarding the inadequacy of current navigation technologies. In particular, the applicant has observed that the graphical current position indicator on a map sometimes conveys an inadequate sense of position to the user, particularly in situations where the user wishes to know the street address corresponding to his or her current position.

In other words, the user's sense of position often depends on the availability of adequate landmarks, cross streets or points of interest visible both on the map and in reality. However, without reference to any visible landmarks, cross streets or points of interest, it is often difficult for the user to know with precision where he or she is located along a given street, boulevard or highway.

In particular, when navigating along a street, boulevard or other roadway, it would be helpful for the user to be made aware of the street numbers corresponding to the current position. Using current technology, this would only be possible by inputting a destination or waypoint address, so as to be guided to a particular street address. However, it is often inconvenient for the user to have to do so. Rather, it would be useful to present this address information to the user, visually on the map and/or audibly via text-to-speech, so that the user would be kept apprised of the street address corresponding to his or her current position. For example, the user might receive a voice call from a friend telling him to come to a certain address. The user could then simply rely on the presented street numbers rather than having to program a destination or waypoint while driving through traffic. The only prior art GPS navigation unit known to the applicant that provides anything related to street addresses is the Garmin™ StreetPilot c330 Automotive GPS which displays static street numbers, for example at an intersection of a boulevard. However, these static numbers do not identify the street address corresponding to the current position. Therefore, the Garmin™ technology would not assist a user who wishes to know the street address corresponding to his present location.

A further, yet related, problem recognized by the applicant is that it is often difficult for the user to see street numbers on passing dwellings and buildings, a problem that is particularly acute at night when street numbers on dwellings and buildings along the roadways are obscured by darkness. Even in daylight, street numbers can be difficult to read from heavy or fast-moving traffic, particularly where buildings or dwellings are set back far from the roadway. This problem is also solved by presenting address information, for example, in the form of street numbers beside the graphical current position indicator on the map.

One aspect of the present technology is a method of displaying a map on a wireless communications device. The method includes steps of identifying a position on the map, determining address information corresponding to the position displayed on the wireless communications device, and presenting the address information via a user interface of the device.

In one implementation of this aspect of the present technology, a method of displaying a map on a wireless communications device comprises steps of determining a current position of the wireless communications device, determining address information corresponding to the current position of the wireless communications device, and presenting the address information to a user of the device.

Another aspect of the present technology is a computer program product comprising code adapted to perform the steps of the foregoing method when the computer program product is loaded into memory and executed on a processor of a wireless communications device.

Yet another aspect of the present technology is a wireless communications device having a display for displaying a map, and a processor operatively coupled to memory for identifying a position on the map and for executing a map application configured to render the map on the display of the device, the map application being configured to dynamically determine and present address information corresponding to the position identified on the map.

In one implementation of this aspect of the present technology, a wireless communications device has a Global Positioning System (GPS) receiver for determining a current position of the device, and a processor operatively coupled to memory for executing a map application configured to render a map on a display of the device showing the current position of the device on the map, the map application being further configured to determine and present address information corresponding to the current position of the device.

The details and particulars of these aspects of the technology will now be described below, by way of example, with reference to the attached drawings.

FIG. 1 is a block diagram of an exemplary communication system 100 which includes an exemplary wireless communications device 102 (also referred to as a mobile communications device or wireless handheld) which communicates through a wireless communications network 104. For the purposes of the present specification, the expression "wireless communications device" encompasses not only a wireless handheld, cell phone or wireless-enabled laptop but also any mobile communications device or portable communications device such as a satellite phone, wireless-enabled PDA, wireless-enabled MP3 player, or wireless-enabled portable GPS navigation unit. In other words, for the purposes of this specification, "wireless" shall be understood as encompassing not only standard cellular or microwave RF technologies, but also any other communications technique that conveys data over the air using an electromagnetic signal.

The wireless communications device 102 preferably includes a visual display 112, e.g. an LCD screen, a keyboard 114 (or keypad), and optionally one or more auxiliary user interfaces (UI) 116, each of which is coupled to a controller 106. The controller 106 is also coupled to radio frequency (RF) transceiver circuitry 108 and an antenna 110. Typically, controller 106 is embodied as a central processing unit (CPU) which runs operating system software in a memory device (described later with reference to FIG. 2). Controller 106 normally controls the overall operation of the wireless communications device 102, whereas signal processing operations associated with communications functions are typically performed in the RF transceiver circuitry 108. Controller 106 interfaces with the display screen 112 to display received information, stored information, user inputs, and the like. Keyboard/keypad 114, which may be a telephone-type keypad or a full QWERTY keyboard, is normally provided for entering commands and data.

The wireless communications device 102 sends communication signals to and receives communication signals from network 104 over a wireless link via antenna 110. RF transceiver circuitry 108 performs functions similar to those of station 118 and Base Station Controller (BSC) 120, including, for example, modulation and demodulation, encoding and decoding, and encryption and decryption. It will be apparent to those skilled in the art that the RF transceiver circuitry 108 will be adapted to the particular wireless network or networks in which the wireless communications device is intended to operate.

The wireless communications device 102 includes a battery interface 134 for receiving one or more rechargeable batteries 132. Battery 132 provides electrical power to electrical circuitry in the device 102, and battery interface 134 provides for a mechanical and electrical connection for battery 132. Battery interface 134 is couple to a regulator 136 which regulates power to the device. When the wireless device 102 is fully operationally, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Wireless communications device 102 can operate using a Subscriber Identity Module (SIM) 140 which is connected to or inserted in the wireless communications device 102 at a SIM interface 142. SIM 140 is one type of a conventional "smart card" used to identify an end user (or subscriber) of wireless device 102 and to personalize the device, among other things. By inserting the SIM card 140 (or equivalent) into the wireless communications device 102, an end user can have access to any and all of his subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical wireless device. SIM 140 may store additional user information for the wireless device as well, including datebook (calendar) information and recent call information.

The wireless communications device 102 may consist of a single unit, such as a data communication device, a cellular telephone, a Global Positioning System (GPS) unit or other positioning subsystem, a multiple-function communication device with data and voice communication capabilities, a wireless-enabled personal digital assistant (PDA), or a wireless-enabled laptop computer. Alternatively, the wireless communications device 102 may be a multiple-module unit comprising a plurality of separate components, including but in no way limited to a computer or other device connected to a wireless modem. In particular, for example, in the block diagram of FIG. 1, RF circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU.

The wireless communications device 102 communicates in and through a wireless communication network 104. The wireless communication network may be a cellular telecommunications network. In the example presented in FIG. 1, wireless network 104 is configured in accordance with Global Systems for Mobile communications (GSM) and General Packet Radio Service (CPRS) technologies. Although wireless communication network 104 is described herein as a GSM/GPRS-type network, any suitable network technologies may be utilized such as Code Division Multiple Access (CDMA), Wideband CDMA (WCDMA), whether 2G, 3G, or Universal Mobile Telecommunication System (UMTS) based technologies. In this example, the GSM/CPRS wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is, in turn, coupled to a public or private data network 130 (such as the Internet). HLR 132 is coupled to MSC 122, SGSN 126 and GGSN 128.

Tower station 118 is a fixed transceiver station. Tower station 118 and BSC 120 may be referred to as transceiver equipment. The transceiver equipment provides wireless network coverage for a particular coverage area commonly referred to as a "cell". The transceiver equipment transmits communication signals to and receives communication signals from wireless communications devices 102 within its cell via station 118. The transceiver equipment normally performs such functions as modulation and possibly encoding and/or encryption of signals to be transmitted to the wireless communications device in accordance with particular, usually predetermined, communication protocols and parameters. The transceiver equipment similar demodulates and possibly decodes and decrypts, if necessary, any communication signals received from the wireless communications device 102 transmitting within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and wireless communications device 102. An RF channel is a limited resource that must be conserved, typically due limits in overall bandwidth and a limited battery power of the wireless device 102. Those skilled in the art will appreciate that a wireless network in actual practice may include hundreds of cells, each served by a station 118, depending upon desired overall expanse of network coverage. All pertinent components may be connected by multiple switches and routers (not shown), controlled by multiple network controllers.

For all wireless communications devices 102 registered with a network operator, permanent data (such as the user profile associated with each device) as well as temporary data (such as the current location of the device) are stored in the HLR 132. In case of a voice call to the wireless device 102, the HLR 132 is queried to determine the current location of the device 102. A Visitor Location Register (VLR) of MSC 122 is responsible for a group of location areas and stores the data of those wireless devices that are currently in its area of responsibility. This includes parts of the permanent data that have been transmitted from HLR 132 to the VLR for faster access. However, the VLR of MSC 122 may also assign and store local data, such as temporary identifications. Optionally, the VLR of MSC 122 can be enhanced for more efficient coordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of wireless devices 102. SGSN 126 also performs security functions and access control. Gateway GPRS Support Node (GGSN) 128 provides internetworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by wireless device 102 or by the transceiver equipment instructing the wireless device to select a particular cell. The wireless device 102 informs wireless network 104 when it reselects another cell or group of cells, known as a routing area.

In order to access GPRS services, the wireless device 102 first makes its presence known to wireless network 104 by performing what is known as a GPRS "attach". This operation establishes a logical link between the wireless device 102 and SGSN 126 and makes the wireless device 102 available to receive, for example, pages via SGSN, notifications of incoming GPRS data, or SMS messages over GPRS. In order to send and receive GPRS data, the wireless device 102 assists in activating the packet data address that it wants to use. This operation makes the wireless device 102 known to GGSN 128; internetworking with external data networks can thereafter commence. User data may be transferred transparently between the wireless device 102 and the external data networks using, for example, encapsulation and tunnelling. Data packets are equipped with GPRS-specific protocol information and transferred between wireless device 102 and GGSN 128.

Those skilled in the art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
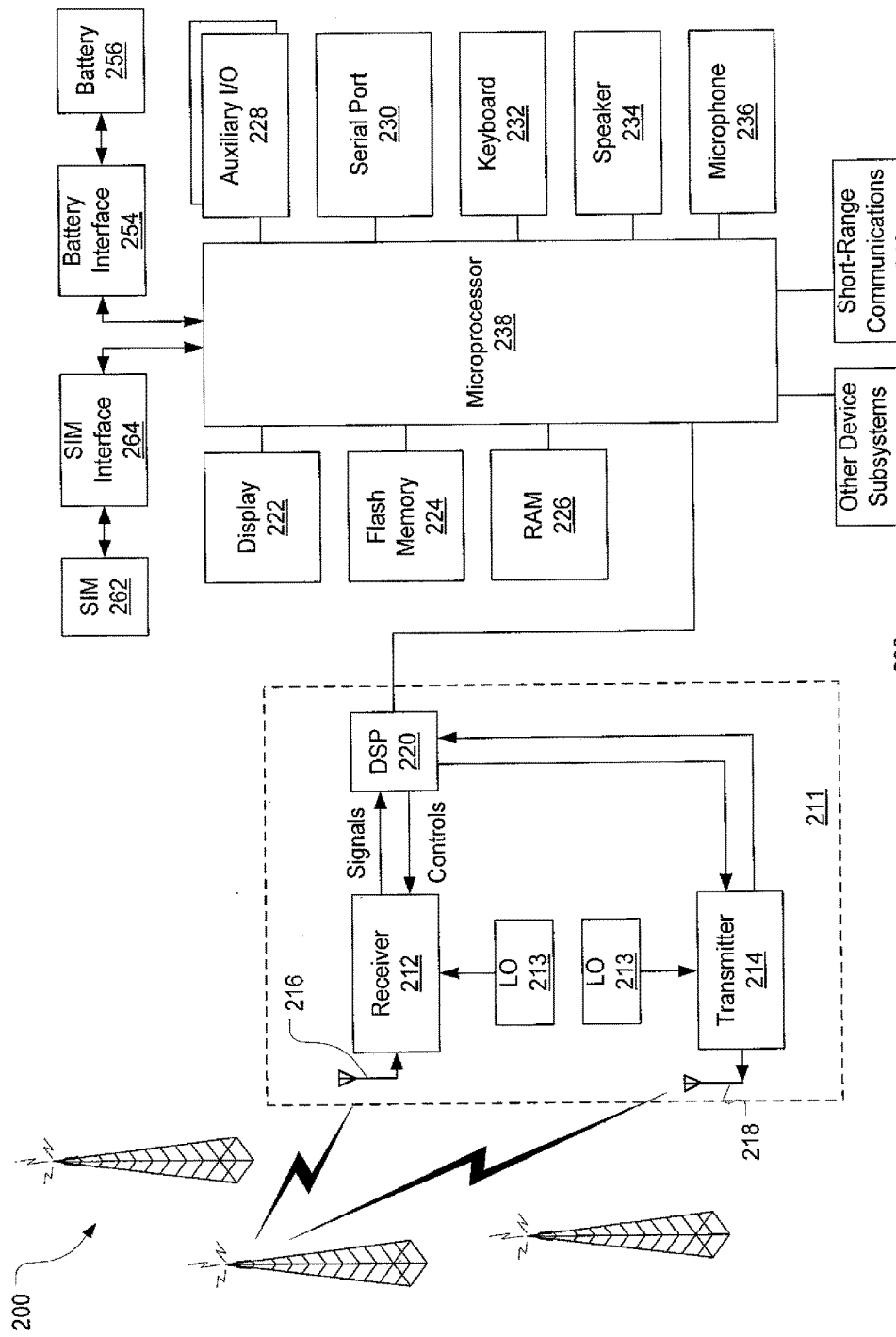
FIG. 2 is a more detailed block diagram of an exemplary wireless communications device.

FIG. 2 is a detailed block diagram of an exemplary wireless communications device 202. The wireless device 202 is preferably a two-way communication device having at least voice and advanced data communication capabilities, including the capability to communicate with other computer systems. Depending on the functionality provided by the wireless device 202, it may be referred to as a data messaging device, a two-way pager, a cellular telephone with data message capabilities, a wireless Internet appliance, or a data communications device (with or without telephony capabilities). The wireless device 202 may communicate with any one of a plurality of fixed transceiver stations 200 within its geographic coverage area.

The wireless communications device 202 will normally incorporate a communication subsystem 211, which includes a receiver 212, a transmitter 214, and associated components, such as one or more (preferably embedded or internal) antenna elements 216 and 218, local oscillators (LO's) 213, and a processing module such as a digital signal processor (DSP) 220. Communication subsystem 211 is analogous to RF transceiver circuitry 108 and antenna 110 shown in FIG. 1. As will be apparent to those skilled in the field of communications, the particular design of communication subsystem 211 depends on the communication network in which the wireless device 202 is intended to operate.

The wireless device 202 may send and receive communication signals over the network after required network registration or activation procedures have been completed. Signals received by antenna 216 through the network are input to receiver 212, which may perform common receiver functions as signal amplification, frequency down conversion, filtering, channel selection, and the like, and, as shown in the example of FIG. 2, analog-to-digital (A/D) conversion. A/D conversion of a received signal allows more complex communication functions such as demodulation and decoding performed in the DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in the DSP 220.

Network access is associated with a subscriber or user of the wireless device 202, and therefore the wireless device requires a Subscriber Identity Module or SIM card 262 to be inserted in a SIM interface 264 in order to operate in the network. SIM 262 includes those features described in relation to FIG. 1. Wireless device 202 is a battery-powered device so it also includes a battery interface 254 for receiving one or more rechargeable batteries 256. Such a battery 256 provides electrical power to most if not all electrical circuitry in the device 102, and battery interface provides for a mechanical and electrical connection for it. The battery interface 254 is coupled to a regulator (not shown) which provides a regulated voltage V to all of the circuitry.

Wireless communications device 202 includes a microprocessor 238 (which is one implementation of controller 106 of FIG. 1) which controls overall operation of wireless device 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-board functions. Notably, some subsystems, such as keyboard 232 and display 222, for example, may be used for both communication-related functions, such as entering a text message for transmission over a communication network, and device-resident functions such as a calculator or task list. Operating system software used by the microprocessor 238 is preferably stored in a persistent (non-volatile) store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, enables execution of software applications on the wireless device 202. A predetermined set of applications which control basic device operations, including at least data and voice communication applications, will normally be installed on the device 202 during its manufacture. For example, the device may be pre-loaded with a personal information manager (PIM) having the ability to organize and manage data items relating to the user's profile, such as e-mail, calendar events, voice mails, appointments, and task items. Naturally, one or more memory stores are available on the device 202 and SIM 256 to facilitate storage of PIM data items and other information.

The PIM application preferably has the ability to send and receive data items via the wireless network. PIM data items may be seamlessly integrated, synchronized, and updated via the wireless network, with the wireless device user's corresponding data items stored and/or associated with a host computer system thereby creating a mirrored host computer on the wireless device 202 with respect to such items. This is especially advantageous where the host computer system is the wireless device user's office computer system. Additional applications may also be loaded into the memory store(s) of the wireless communications device 202 through the wireless network, the auxiliary I/O subsystem 228, the serial port 230, short-range communications subsystem 240, or any other suitable subsystem 242, and installed by a user in RAM 226 or preferably a non-volatile store (not shown) for execution by the microprocessor 238. Such flexibility in application installation increases the functionality of the wireless device 202 and may provide enhanced onboard functions, communication-related functions or both. For example, secure communication applications may enable electronic commerce functions and other such financial transactions to be performed using the wireless device 202.

In a data communication mode, a received signal such as a text message, an e-mail message, or a web page download will be processed by communication subsystem 211 and input to microprocessor 238. Microprocessor 238 will preferably further process the signal for output to display 222 or alternatively to auxiliary I/O device 228. A user of the wireless device 202 may also compose data items, such as email messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of the wireless communications device 202 is substantially similar, except that the received signals would be output to speaker 234 and signals for transmission would be generated by microphone 236. Alternative voice or audio I/O subsystems, such as a voice message recording subsystem, may also be implemented on the wireless device 202. Although voice or audio signal output is preferably accomplished primarily through speaker 234, display 222 may also be used to provide an indication of the identity of the calling party, duration on a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of wireless device 202 by providing for information or software downloads to the wireless device 202 other than through the wireless network. The alternate download path may, for example, be used to load an encryption key onto the wireless device 202 through a direct and thus reliable and trusted connection to thereby provide secure device communications.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a trademark of Bluetooth SIG, Inc.

Figure 3A:
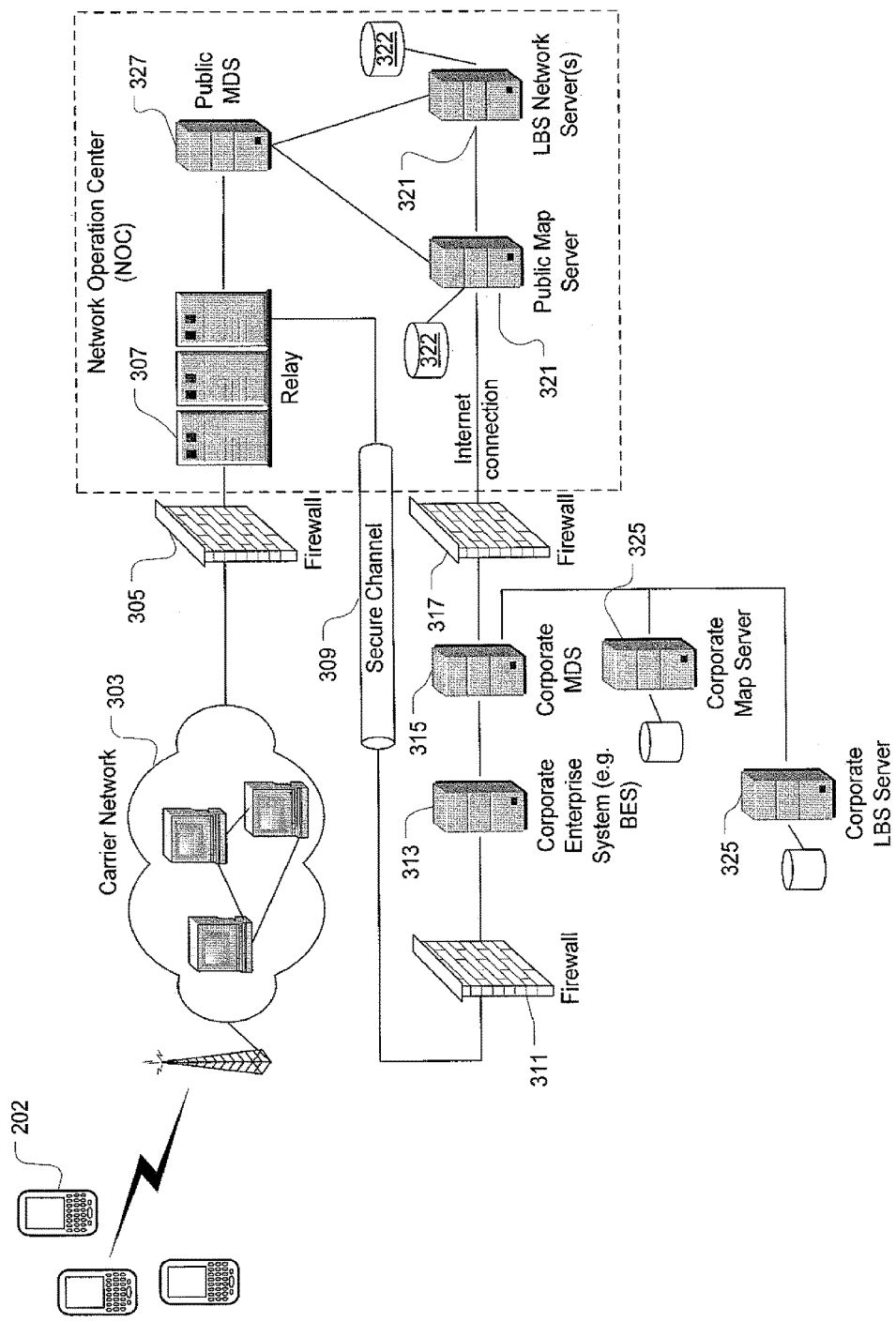
FIG. 3A is a system diagram of network components which provide mapping functionality in the exemplary wireless communications devices of FIG. 1 and FIG. 2.

FIG. 3A is a system diagram of network components which provide mapping functionality in the exemplary wireless communication devices of FIGS. 1 and 2. To achieve this, a mapping application is also provided in memory of the wireless communications device for rendering visual maps in its display. Wireless communications devices 202 are connected over a mobile carrier network 303 for communication through a firewall 305 to a relay 307. A request for map data from any one of the wireless communications devices 202 is received at relay 307 and passed via a secure channel 309 through firewall 311 to a corporate enterprise server 313 and corporate mobile data system (MDS) server 315. The request is then passed via firewall 317 to a public map server and/or to a public location-based service (LBS) server 321 which provides location-based services (LBS) to handle the request. The network may include a plurality of such map servers and/or LBS servers where requests are distributed and processed through a load distributing server. The map/LBS data may be stored on this network server 321 in a network database 322, or may be stored on a separate map server and/or LBS server (not shown). Private corporate data stored on corporate map/LBS server 325 may be added to the public data via corporate MDS server 315 on the secure return path to the wireless device 202. Alternatively, where no corporate servers are provided, the request from the wireless device 202 may be passed via relay 307 to a public MDS server 327, which sends the request to the public map/LBS server 321 providing map data or other local-based service in response to the request. For greater clarity, it should be understood that the wireless devices can obtain map data from a "pure" map server offering no location-based services, from an LBS server offering location-based services in addition to map content, or from a combination of servers offering map content and LBS.

A Maplet data structure is provided (as a preferred data structure) that contains all of the graphic and labelled content associated with a geographic area (e.g. map features such as restaurants (point features), streets (line features) or lakes (polygon features)). Maplets are structured in Layers of Data Entries ("DEntries") identified by a "Layer ID" to enable data from different sources to be deployed to the device and meshed for proper rendering. Each DEntry is representative of one or more artefact or label (or a combination of both) and includes coordinate information (also referred to as a "bounding box" or "bounding area") to identify the area covered by the DEntry and a plurality of data points that together represent the artefact, feature or label. For example, a DEntry may be used to represent a street on a city map (or a plurality of streets), wherein the carious points within the DEntry are separated into different parts representing various portions of the artefact or map feature (e.g. portions of the street). A wireless device may issue a request for the map server to download only those DEntries that are included within a specified area or bounding box representing an area of interest that can be represented by, for example, a pair of bottom left, top right coordinates.

Figure 3B:
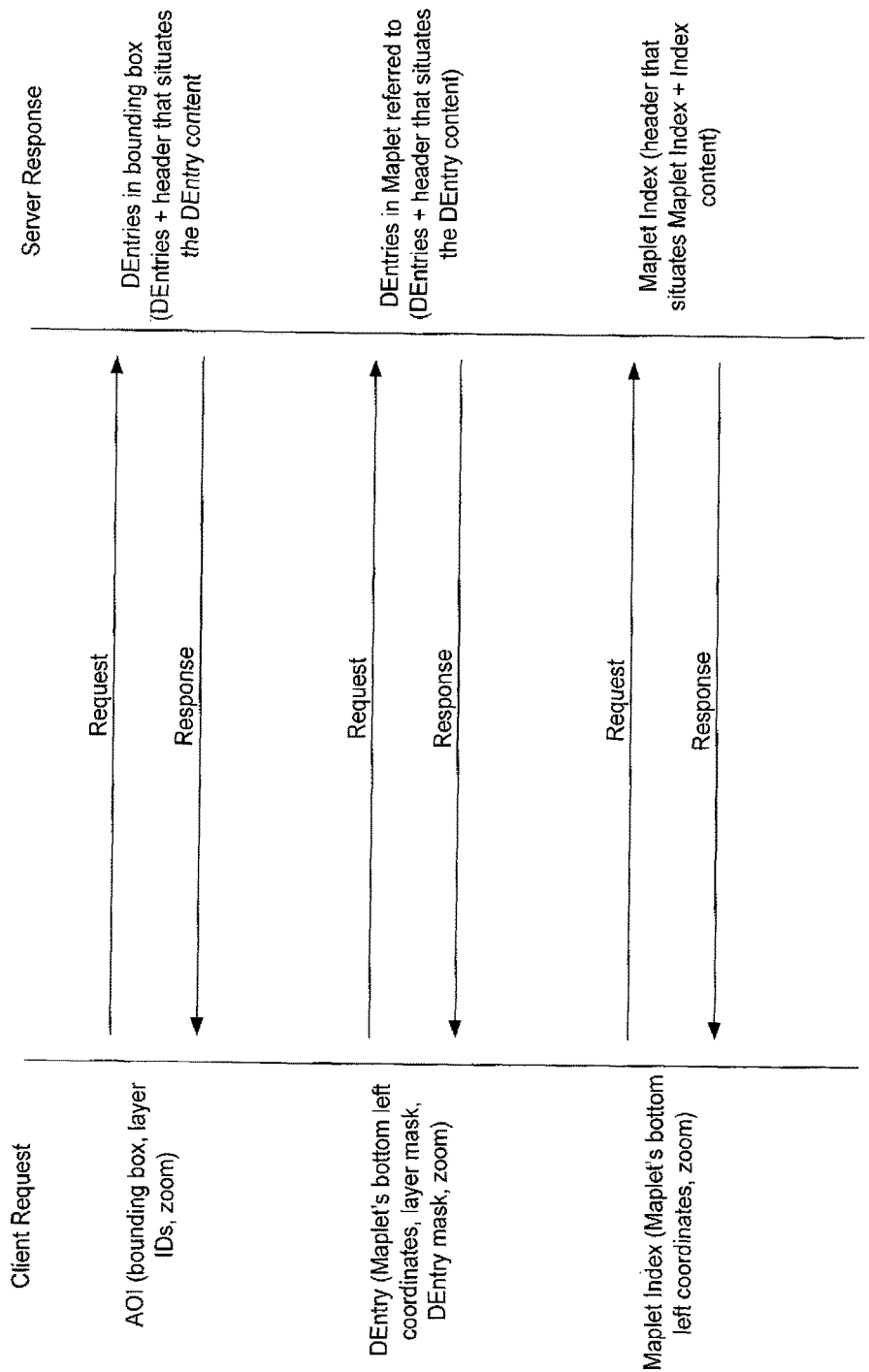
FIG. 3B illustrates an example of a message exchange between a wireless communications device and a map server for downloading map content to the wireless communications device based on the system of FIG. 3A.

As depicted in FIG. 3B, the wireless communications device issues one or more AOI (Area of Interest) requests, DEntry or data requests and Maplet Index requests to the map server for selective downloading of map data based on user context. Thus, rather than transmitting the entire map data for an area in reply to each request from the device (which burdens the wireless link), local caching may be used in conjunction with context filtering of map data on the server. For example, if a user's wireless device is GPS-enabled and the user is traveling in an automobile at 120 km/h along a freeway then context filtering can by employed to prevent downloading of map data relating to passing side streets. Or, if the user is traveling in an airplane at 30,000 feet, then context filtering can be employed to prevent downloading of map data for any streets whatsoever. Also, a user's context can be defined, for example, in terms of occupation, e.g. a user whose occupation is a transport truck driver can employ context filtering to prevent downloading of map data for side streets on which the user's truck is incapable of traveling, or a user whose occupation is to replenish supplied of soft drink dispensing machines can employ context filtering to download public map data showing the user's geographical area of responsibility with irrelevant features such as lakes and parks filtered out and private map data containing the location of soft drink dispensing machines superimposed on the public map data.

The Maplet Index request results in a Maplet Index (i.e. only a portion of the Maplet that provides a table of contents of the map data available within the Maplet rather than the entire Maplet) being downloaded from the map server to the device, thereby conserving OTA(Over-the-Air) bandwidth and device memory caching requirements. The Maplet Index conforms to the same data structure as a Maplet, but omits the data points. Consequently, the Maplet Index is small (e.g. 300-400 bytes) relative to the size of a fully populated Maplet or a conventional bit map, and includes DEntry bounding boxes and attributes (size, complexity, etc.) for all artefacts within the Maplet. As the field of view changes (e.g. for a location-aware device that displays a map while moving), the device (client) software assesses whether or not it needs to download additional data from the server. Thus, if the size attribute or complexity attribute of an artefact that has started to move into the field of view of the device (but is not yet being displayed) is not relevant to the viewer's current context, then the device can choose not to display that portion of the artifact. On the other hand, if the portion of the artefact is appropriate for display, then the device accesses its cache to determine whether the DEntries associated with that portion of the artefact have already been downloaded, in which case the cached content is displayed. Otherwise, the device issues a request for the map server to download all the of the DEntries associated with the artifact portion.

By organizing the Maplet data structure in Layers, it is possible to seamlessly combine and display information obtained from public and private databases. For example, it is possible for the device to display an office building at a certain address on a street (e.g. a $1^{st}$ z-order attribute from public database), adjacent a river (e.g. a $2^{nd}$ z-order attribute from public database), with a superimposed floor plane of the building to show individual offices (e.g. $11^{th}$ z-order attribute from a private database, accessible through a firewall).

Referring back to FIG. 3A, within the network having map server(s) and/or LBS server(s) 321 and database(s) 322 accessible to it, all of the map data for the entire world is divided and stored as a grid according to various levels of resolution (zoom), as set forth below in Table A. Thus, a single A-level Maplet represents a 0.05×0.05 degree grid area; a single B-level Maplet represents a 0.5×0.5 degree grid area; a single C-level Maplet represents a 5×5 degree grid area; a single D-level Maplet represents a 50×50 degree grid area; and a single E level Maplet represents the entire world in a single Maplet. It is understood that Table A is only an example of a particular Maplet grid division; different grid divisions having finer or coarser granularity may, of courser, be substituted. A Maplet includes a set of layers, with each layer containing a set of DEntries, and each DEntry containing a set of data points.

TABLE A

| Level | Grid (degrees) | # of Maplets to cover the World | # of Maplets to cover North America | # of Maplets to cover Europe |
|---|---|---|---|---|
| A | 0.05 × 0.05 | 25,920,000 | 356,000 | 100,000 |
| B | 0.5 × 0.5 | 259,200 | 6,500 | 1000 |
| C | 5 × 5 | 2,592 | 96 | 10 |
| D | 50 × 50 | 32 | 5 | 5 |
| E | World | 1 | 1 | 1 |

As mentioned above, three specific types of requests may be generated by a wireless communications device (i.e. the client)—AOI requests, DEntry requests and Maplet Index requests. The requests may be generated separately or in various combinations, as discussed in greater detail below. An AOI (area of interest) request calls for all DEntries in a given area (bounding box) for a predetermined or selected set of z-order Layers. The AOI request is usually generated when the device moves to a new area so as to fetch DEntries for display before the device client knows what is available in the Maplet. The Maplet Index has the exact same structure as a Maplet but does not contain complete DEntries (i.e. the data Points actually representing artifacts and labels are omitted). Thus, a Maplet Index defines what Layers and DEntries are available for a given Maplet. A data or DEntry request is a mechanism to bundle together all of the required Dentries for a given Maplet.

Typically, AOI and Maplet Index requests are paired together in the same message, although they need not be, while DEntry requests are generated most often. For example, when a wireless device moves into an area for which no information has been stored on the device client, the Maplet Index request returns a Maplet Index that indicates what data the client can specifically request from the server 321, while the AOI request returns any DEntries within the area of interest for the specified Layers (if they exist). In the example requests shown on FIG. 3B, the desired Maplet is identified within a DEntry request by specifying the bottom-left Maplet coordinate. In addition, the DEntry request may include a layer mask so that unwanted Layers are not downloaded, a DEntry mask so that unwanted data Points are not downloaded, and zoom values to specify a zoom level for the requested DEntry. Once the device client has received the requested Maplet Index, the client typically then issues multiple DEntry requests to ask for specific DEntries (since the client knows all of the specific DEntries that are available based on the Maplet Index).

In this particular implementation, a collection of 20×20 A-level Maplets (representing a 1×1 degree square) is compiled into a Maplet Block File (.mbl). An .mbl file contains a header which specifies the offset and length of each Maplet in the .mbl file. The same 20×20 collection of Maplet index data is compiled into a Maplet Index file (.mbx). The .mbl and .mbx file structures are set forth in Tables B and C, respectively.

TABLE B

| Address Offset | Offset | Length |
|---|---|---|
| 0x000 | Maplet #0 Offset (4 bytes) | Maplet #0 Length (4 bytes) |
| 0x008 | Maplet #1 Offset | Maplet #1 Length |
| 0x010 | Maplet #2 Offset | Maplet #2 Length |
| ... | ... | ... |
| 0xC78 | Maplet #399 Offset | Maplet #399 Length |

TABLE B-continued

| Address Offset | Offset | Length |
|---|---|---|
| 0xC80 | | Beginning of Maplet #0 |
| 0xC80 + Size of Maplet #0 | | Beginning of Maplet #1 |
| 0xC80 + Size of Maplet #0 + #1 | | Beginning of Maplet #2 |
| ... | | ... |
| 0xC80 + Σ of Size of Maplets (#0: #398) | | Beginning of Maplet #399 |

In Table B, the offset of Maplet #0 is 0x0000_0000 since, in this particular example, the data structure is based on the assumption that the base address for the actual Maplet data is 0x0000_0C80. Therefore the absolute address for Maplet #0 data is: Maplet #0 Address=Base Address (0x0000_0C080)+Maplet #0 Offset (0x0000_0000), and additional Maplet addresses are calculated as: Maplet #(n+1) Offset =Maplet #(n) Offset+Maplet #(n) Length. If a Maplet has no data or does not exist, the length parameter is set to zero (0x0000_0000).

TABLE C

| Address Offset | Offset (4 bytes) | Length (4 bytes) |
|---|---|---|
| 0x000 | Maplet Index #0 Offset | Maplet Index #0 Length |
| 0x008 | Maplet Index #1 Offset | Maplet Index #1 Length |
| 0x010 | Maplet Index #2 Offset | Maplet Index #2 Length |
| ... | ... | ... |
| 0xC78 | Maplet Index #399 Offset | Maplet Index #399 Length |
| 0xC80 | | Beginning of Maplet Index #0 |
| 0xC80 + Size of Maplet Index #0 | | Beginning of Maplet Index #1 |
| 0xC80 + Size of Maplet Index #0 + #1 | | Beginning of Maplet Index #2 |
| ... | | ... |
| 0xC80 + Σ of Size of Maplet Indices (#0: #399) | | Beginning of Maplet Index #399 |

In Table C, the offset of Maplet Index #0 is 0x0000_0000 since, according to an exemplary embodiment the data structure is based on the assumption that the base address for the actual Maplet index data is 0x0000_0C80. Therefore, the absolute address for Maplet Index #0 data is: Maplet Index #0 Address=Base Address (0x0000_0C80)+Maplet Index #0 Offset (0x0000_0000), and additional Maplet index addresses are calculated as: Maplet Index #(n+1) Offset=Maplet Index #(n) Offset+Maplet Index #(n) Length. If a Maplet Index has no data or does not exist, the length parameter is set to zero (0x0000_0000).

Figure 3C:
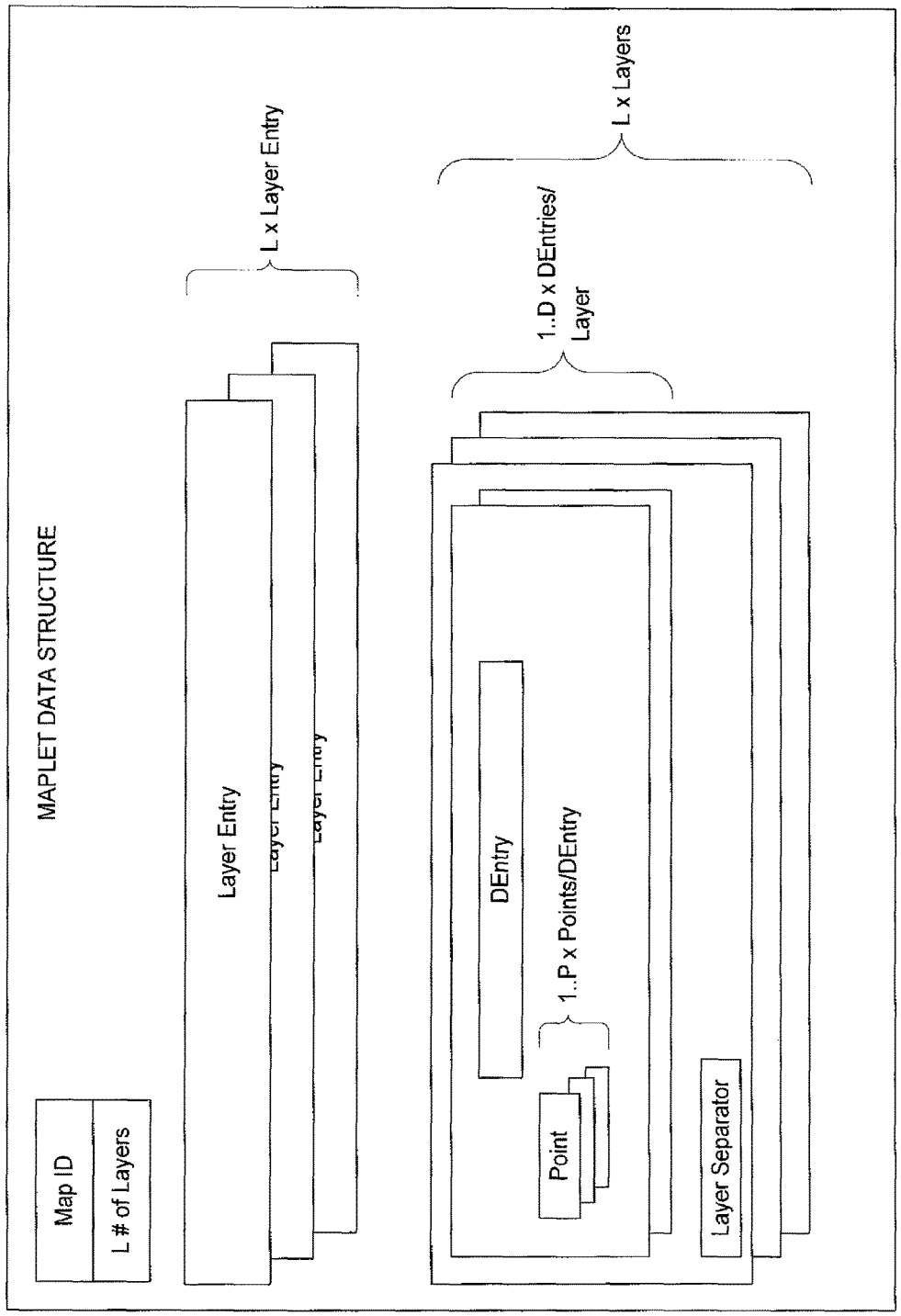
FIG. 3C is a diagram showing a preferred Maplet data structure as an example of one data structure usable for mapping.

FIG. 3C and Table D (below), in combination, illustrate, by way of example only, a basic Maplet data structure. Generally, as noted above, the Maplet data structure can be said to include a Maplet Index (i.e. an index of the DEntries, each of which is representative of either an artifact or a label or both) together with data Points for each DEntry that actually form such artifacts and labels. In this example, each Maplet includes a Map ID (e.g. 0xA1B1C1D1), the # of Layers in the Maplet, and a Layer Entry for each Layer. The Map ID identifies the data as a valid Maplet, and according to one alternative, may also be used to identify a version number for the data. The # of Layers is an integer which indicates the number of Layers (and therefore Layer Entries) in the Maplet. Each Layer Entry defines rendering attributes and is followed by a list of DEntries for each Layer. The above forms a Maplet Index. For a complete Maplet, each DEntry contains a set of data Points (referred to herein as oPoints) or Labels). It will be noted that Layers can have multiple DEntries and the complete list of DEntries and Points are grouped by Layer and separated by a Layer Separator (e.g. hex value 0xEEEEEEEE). In this example, each Layer Entry is 20 bytes long, and a DEntry is 12 bytes long. However, the number of Layers, number of DEntries per Layer and the number of Points per DEntry depends on the map data and is generally variable.

Table D provides a high "byte-level" description of a Maplet for this example.

TABLE D

| Data | Quantity | Total # of Bytes |
|---|---|---|
| Map ID | 1 | 4 bytes |
| # of Layers | 1 | 4 bytes |
| Layer Entries | # of Layers | 20 bytes x (# of Layers) |
| DEntry of a Layer | x (# of DEntries in a Layer) | # of Layers | 12 bytes x (Σ of the # of DEntries in each Layer) + |
| Points for DEntry of a Layer | | | 4 bytes x (Σ of the # of Points in each DEntry in each Layer) + |
| Layer Separator | | | 4 bytes x (# of Layers) |

Although the Maplet data structure is the preferred data structure, it should be appreciated that the present technology can be implemented using other data structures. Moreover, it should be appreciated that, although vector-based map data is preferred, this technology can also be implemented using bitmap-based map applications.

In accordance with one main aspect of the present technology, a wireless communications device (such as device 202 shown in FIG. 4) has a Global Positioning System (GPS) receiver 550 (i.e. an embedded GPS chipset or an externally-connected Bluetoothm GPS puck) for determining a current position of the device. The device 202 has a processor (e.g. microprocessor 238) operatively coupled to memory (e.g. Flash Memory 224 and/or RAM 226) for executing a map (or navigation) application 500 configured to render a map on a display (e.g. GUI 222) of the device in order to show the current position of the device on the map. The map/navigation application 500 is further configured to determine and present address information corresponding to the current position of the device, as will be elaborated below.

Figure 4:
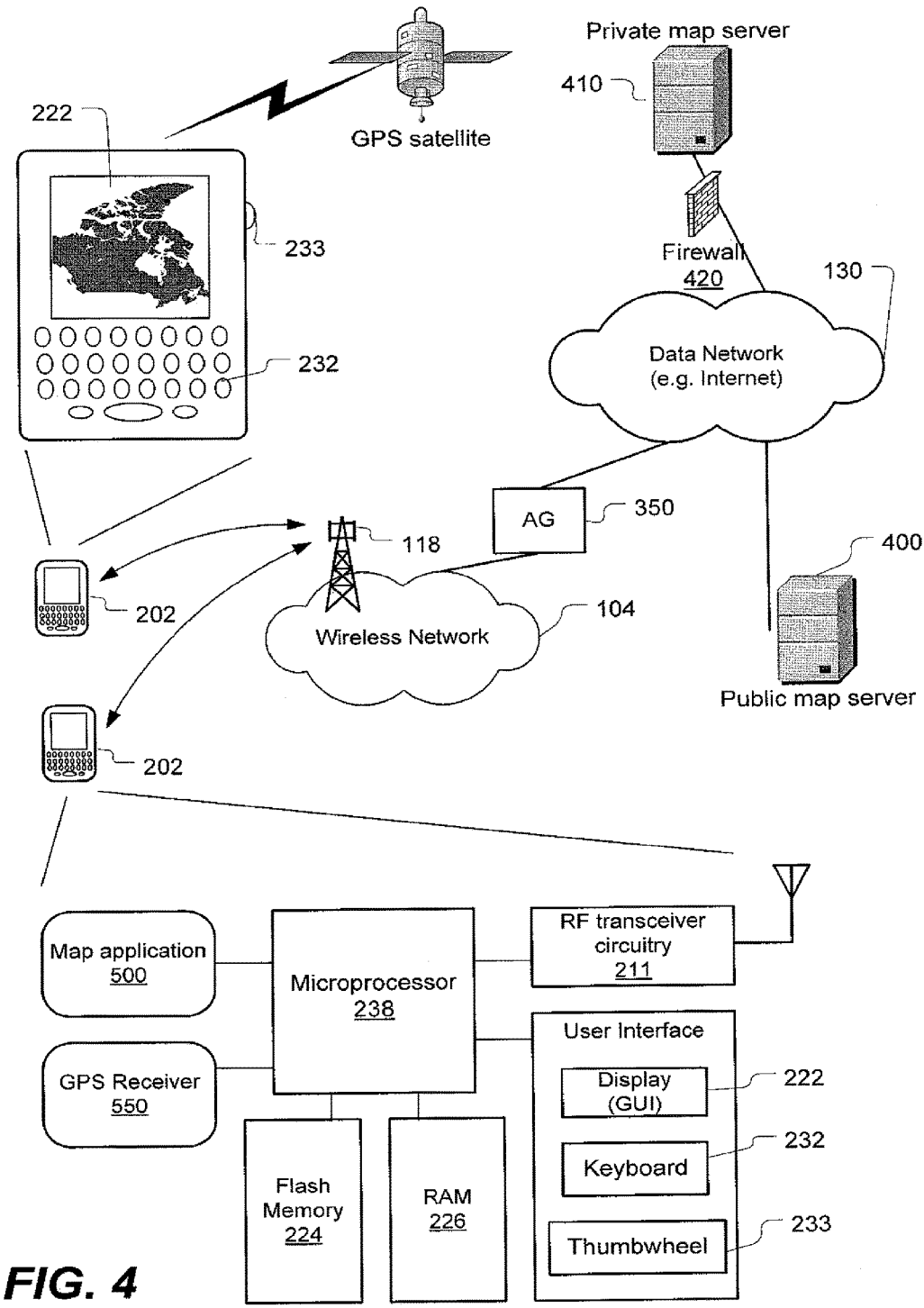
FIG. 4 is a schematic depiction of an example of a wireless network having an applications gateway for optimizing the downloading of map data from map servers to wireless communications devices.

As depicted in FIG. 4, the exemplary handheld wireless communications device 202 has a radiofrequency transceiver (e.g. RF transceiver circuitry 211) for wirelessly exchanging data with data sources on the Internet (data network 130). The wireless device 202 communicates via the wireless network 104 using protocols and techniques known in the art. Mediating between the wireless network 104 and the data network (Internet) 130 is (optionally) an applications gateway (AG) 350 which performs various encodings, mappings, compressions and optimizations on the data in order to facilitate data transmission between the wireless devices 202 and online data sources (e.g. public and private map servers 400, 410) connected to the Internet 130. The map server extracts generic map content from a Geographical Information Systems (GIS) map database (e.g. Navtech®, TelAtlas®, etc.) at a specified level of resolution ("zoom level"). Custom graphics associated with the query, such as highlighted route, pushpin for current position or street address, etc. are post-processed and merged by the server with the generic map content. Relevant screen graphics are then labelled and the merged map graphic is compressed and delivered to the device for display. Alternatively, labelling can be done client-side using a computationally efficient labelling algorithm. As should be readily appreciated, these various aspects of the network are presented merely by way of example, and therefore, it should be understood that the present technology can be implemented on various different types of wireless networks.

The wireless communications device 202 can thus download and display map, route and address information on the display (GUI 222) of the device. As will be elaborated below, the address information displayed onscreen (or otherwise presented to the user, e.g. audibly reported) is determined based on the current position of the device. To determine its current position, the wireless communications device 202 includes a Global Positioning System (GPS) receiver (e.g. GPS chip 550 shown in FIG. 4). The GPS chipset may implement Aided GPS or Assisted GPS technologies to improve acquisition times. Optionally, radiolocation or triangulation techniques can be applied to attempt to improve the accuracy of the GPS position fix. Although the present disclosure refers to expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

As further depicted in FIG. 4, a processor (e.g. microprocessor 238 shown in FIG. 4) is operatively coupled to memory (e.g. Flash Memory 224 and RAM 226 shown in FIG. 4) for executing the map/navigation application that receives GPS position data from the GPS chipset 550. Based on the current position, as determined by the GPS receiver 550, the map/navigation application 500 sends a request to download new or updated map data from a map server (assuming the map data in the local cache is insufficient). The request specifies an area of interest (AOI) having a bounding box that is centered around the GPS-determined coordinates. When the map data is received at the device, a map showing the current position of the device is rendered for display onscreen.

In parallel or sequentially, the GPS position fix (coordinates of longitude and latitude) is also used to determine the street address (or addresses) corresponding to the current position of the device, i.e. the street address of the dwelling or building immediately beside the location of the device (and optionally also that of the dwelling or building directly on the opposite side of the street). This "address information" is then presented (visually and/or audibly). Preferably, the street numbers are displayed on the map. The current position is preferably displayed using a graphical current position indicator (an icon or other symbol) representing the current position of the device on the map. In one implementation, the address information (e.g. street numbers) are displayed immediately beside the graphical current position indicator. The address information or street numbers could also be displayed elsewhere onscreen. The map application is thus configured to determine and present address information corresponding to the current position of the device, as will be further elaborated below.

In operation, a user of the wireless communications device 202 uses an input device such as keyboard 232 and/or thumbwheel/trackball 233 to cause the microprocessor 238 to open the map (or navigation) application 500 stored in the memory 224. Alternatively, the map application can be launched by another application, such as a location-based services (LBS) application. The input device could also be integrated into the LCD display screen in the form a touch-screen device. Using the keyboard 232 and thumbwheel/trackball 233, the user can launch the map/navigation application 500. In response to this request/command, the microprocessor 238 instructs the RF transceiver circuitry 211 to transmit the request over the air through the wireless network 104. The request is processed by the AG 350 and forwarded into the data network (Internet) using standard packet-forwarding protocols to one or more of the public and/or private map servers 400, 410. Accessing a private map server 410 behind a corporate firewall 420 was described above with reference to FIG. 3A. Map data downloaded from these one or more map servers 400, 410 is then forwarded in data packets through the data network and encoded/transformed/optimized by the AG 350 for wireless transmission through the wireless network 104 to the wireless communications device 202 that originally sent the request.

The downloaded map data (including any available label data) can be cached locally in RAM 226, and displayed on the display 222 or graphical user interface (GUI) of the device. If a further request is made by the user (or if the user wants a change in the field of view by zooming or panning), the device will check whether the data required can be obtained from the local cache (RAM 226). If not, the device issues a new request to the one or more map servers 400, 410 in the same manner as described above.

As described earlier, map data can optionally be downloaded first as a Maplet Index enabling the user to then choose which DEntries listed in the Index to download in full. Furthermore, as described earlier, the map application can include user-configurable context filtering that enables the user to filter out unwanted map features or artifacts by not downloading specific DEntries corresponding to those unwanted map features or artifacts.

Figure 5:
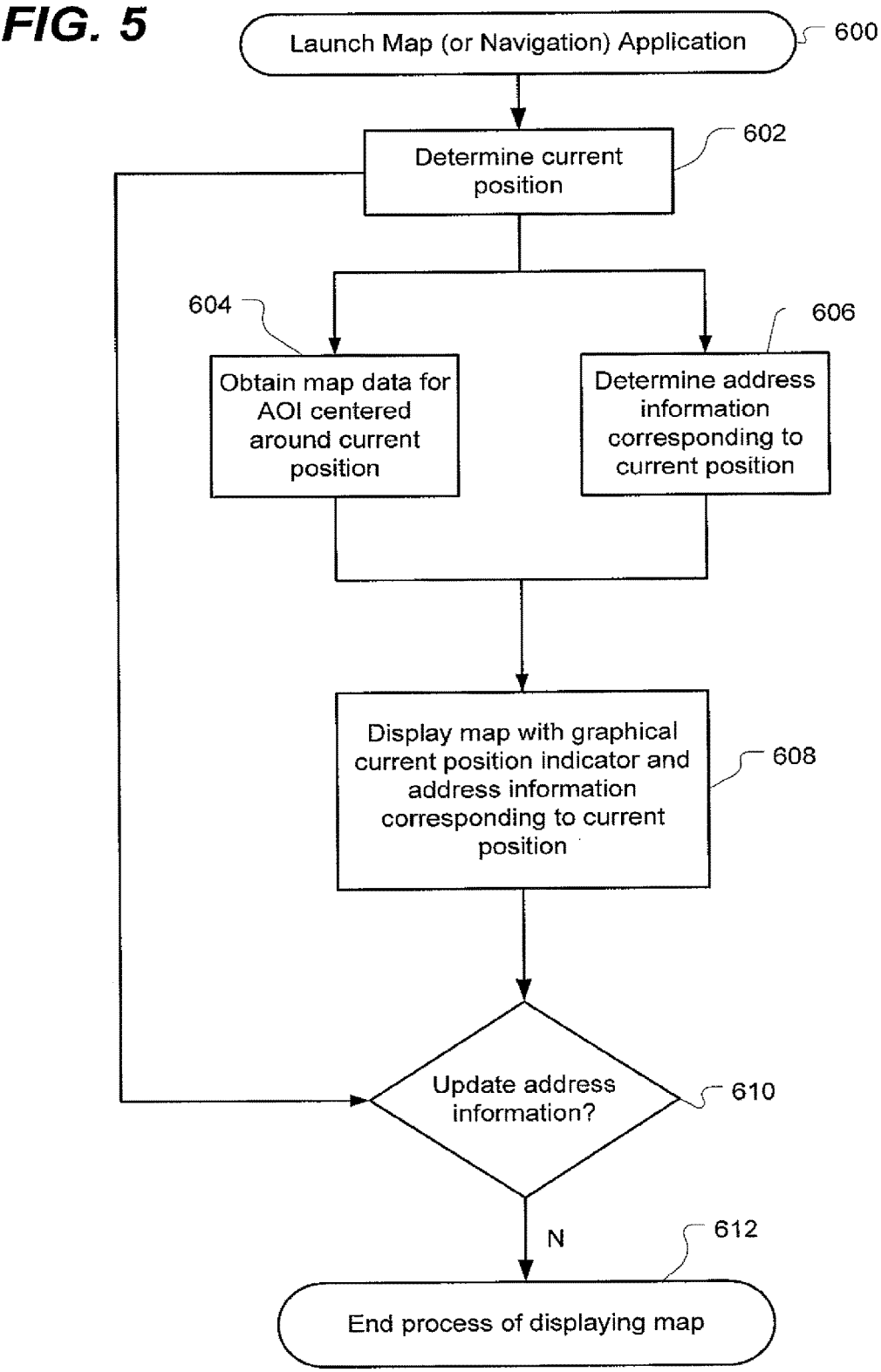
FIG. 5 is a flowchart presenting steps of a method of dynamically displaying address information on a map in accordance with implementations of the present technology.

Operation of the present address-displaying technology introduced above will now be described with reference to the method steps depicted in the flowchart of FIG. 5. As depicted in FIG. 5, this novel method of dynamically displaying address information on a map rendered onscreen on a wireless communications device includes an initial step 600 of launching a map/navigation application. This can be done directly by the user of the device, indirectly by means of another application, e.g. an LBS application that causes the map application to open, or "automatically" by putting the device into "navigation mode".

At step 602, the device determines its current position (using the GPS chip). Based on knowledge of the current position of the device, two further actions transpire, as depicted by FIG. 5. First, at step 604, the device obtains map data for an area of interest (AOI) centered around the current position. Sufficient map data may already be cached locally (this might occur in a case where the device is backtracking into an area for which map data has recently being downloaded). Thus, the device first checks its local cache. If insufficient map data is cached, because the device is moving into a new area, then a request is transmitted wirelessly to a map server. The request defines the AOI (usually with bounding box coordinates) and specifies a zoom level (the zoom may be preset or preconfigured for road-based navigation purposes, or it may also be manually adjusted by the user). The map server then returns map data wirelessly to the device to enable the device to render the map data for display onscreen.

At step 606, the device also uses its current position to determine address information. In other words, a street address (or simply a street number) corresponding to the current position is determined or at least estimated. This can be done in a number of different ways, as will be explained in greater detail below. (It should be noted that steps 604 and 606 can occur concurrently or sequentially, although it is of course quicker to do these operations in parallel.)

At step 608, the device displays the map onscreen with a graphical current position indicator representing the current position of the device on the map. Any suitable icon or symbol (e.g. an arrow, crosshairs, etc.) can be used to graphically represent the current position of the device on the map. At step 608, in addition to displaying the map and graphical current position indicator, the address information is also displayed onscreen.

In one implementation, odd and even street numbers (for each side of the street) are displayed immediately on either side of the graphical current position indicator. Alternatively or additionally, text-to-speech technology can be used to audibly report the street address (es) at periodic (configurable) time- or distance-based intervals (e.g. every 10 seconds, every 20 seconds, every 30 seconds, etc.). Thus, in main implementations of the present technology, the device dynamically updates the address information based on the changing current position of the device and then presents in real-time this dynamically-changing address information to the user of the device, for example, by displaying the street numbers on the map and/or by audibly reporting the street numbers (with or without street names) to the user.

At step 610, after displaying the address information on the map, the device determines whether it needs to dynamically update this address information. If the GPS receiver has detected movement exceeding a predetermined minimum threshold, then the device needs to update its address information accordingly. New GPS position data is obtained from the GPS chip. This new position data is then used to obtain not only new map data but also new address information for the new position. If no movement (or only negligible movement) is detected, the process of dynamically updating the address information is terminated or put in standby (step 612).

In certain cases, if the device is travelling at high speed, the device may not be able to download and display map data (and determine and display address information) fast enough to keep up with the rate of travel. In that case, as an optional variant, the map/navigation application could adapt to the (high) rate of travel and the (low) rate of data throughput by simply predicting a position and street address further down the street from where the device is currently located. If the predictive calculations are accurate, and the user's speed remains constant, then the map will in fact display the predicted position and address when the device actually passes by that position a few seconds later.

Figure 6:
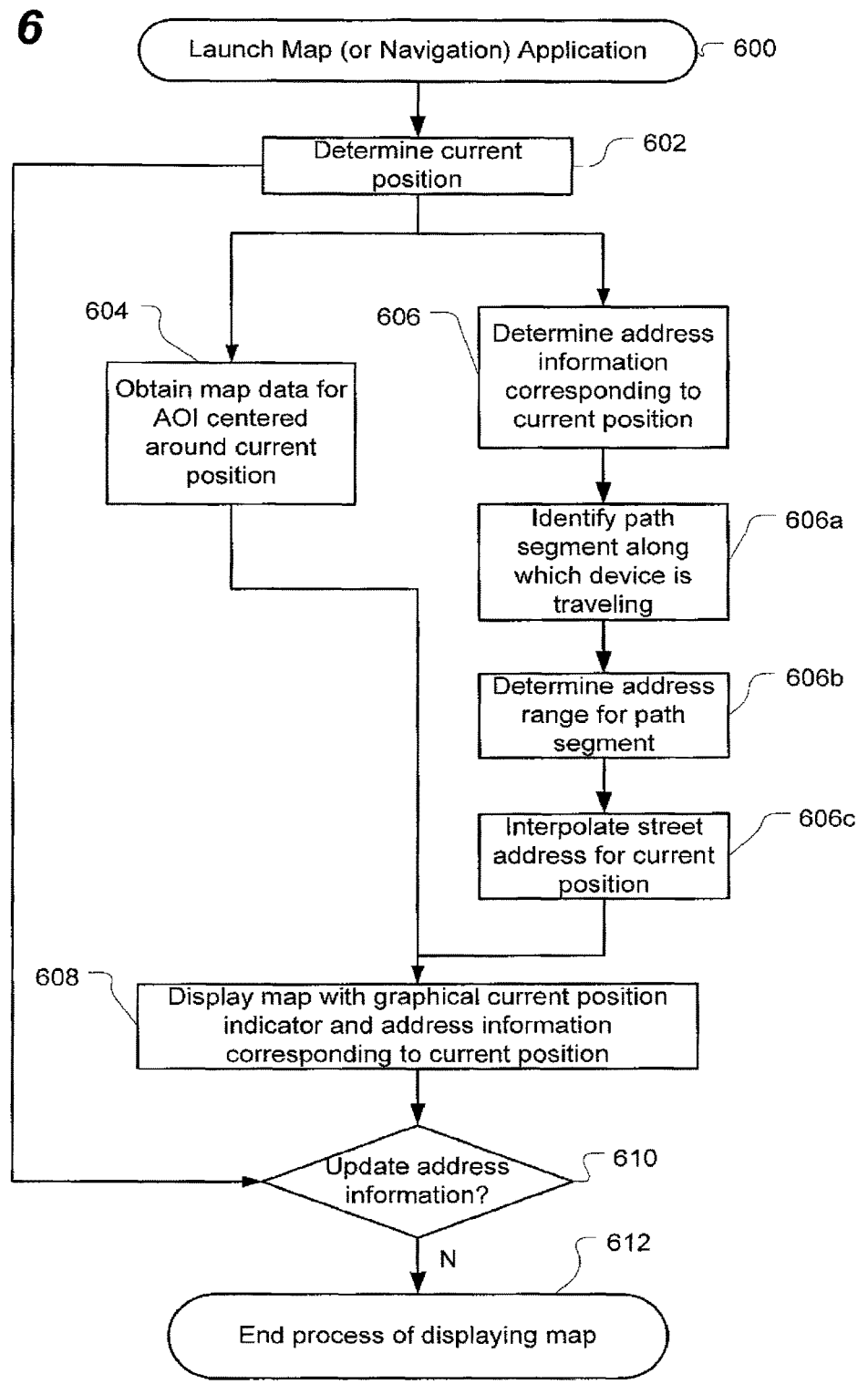
FIG. 6 is a flowchart presenting steps of a method of dynamically displaying address information on a map in accordance with a specific implementation in which the street address is interpolated from an address range.

FIG. 6 is a flowchart presenting steps of a method of dynamically displaying address information on a map in accordance with a specific implementation in which the street address is interpolated from an address range. As will be noted, most of the steps of FIG. 6 are identical to those of FIG. 5. However, the method of FIG. 6 further includes a step 606a of identifying a path segment along which the device is traveling based on the current position of the device. This modified method also includes a step 606b of determining an address range for the path segment and a further step 606c of interpolating a street address corresponding to the current position of the device by calculating a ratio of a distance of the device along the path segment relative to a total length of the path segment and then applying the ratio to the address range to interpolate the street address corresponding to the current position of the device.

Figure 8:
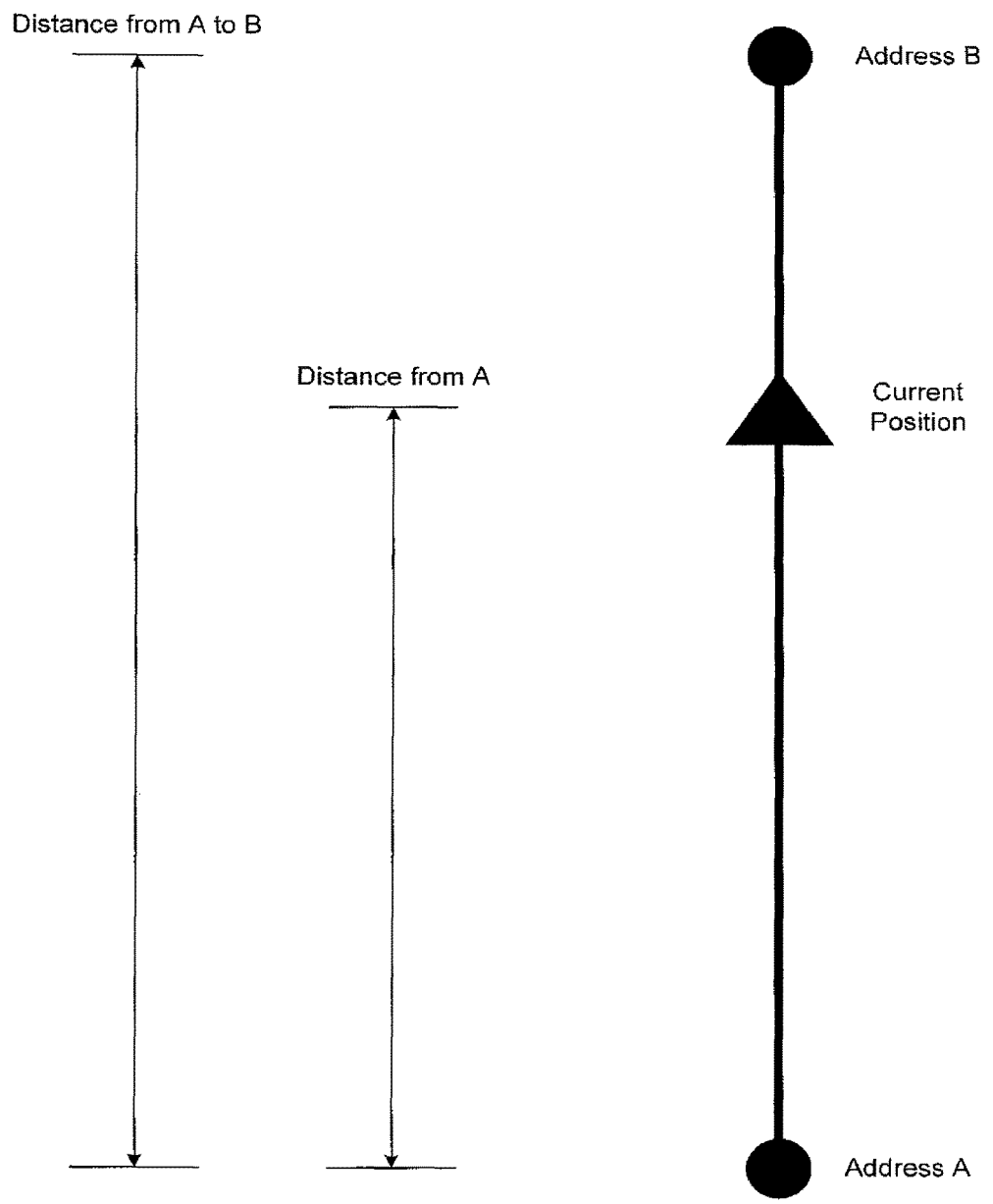
FIG. 8 schematically depicts an address interpolation technique.

For example, with reference to FIG. 8, a formula for interpolating the address corresponding to the current position (the "Current Address") would be as follows:

$$\text{Current Address} = (\text{Address}B - \text{Address}A)/\text{Distance}A\text{to}B * \text{DistanceFrom}A + \text{Address}A$$

Optionally, the method can further entail steps of determining an address spacing between successive street addresses along the path segment and rounding off an interpolated street address to a nearest value of the address spacing. For example, if the street addresses increase in steps of 10, then any interpolation would have to be rounded off to the nearest 10 in order to represent an actual street address on that particular street.

If address jump by a constant factor x, then the formula above can be modified as follows:

$$\text{Current Address Final} = \text{Round}(\text{Current Address}/x) * x$$
where Round represents a rounding function.

Figure 7:
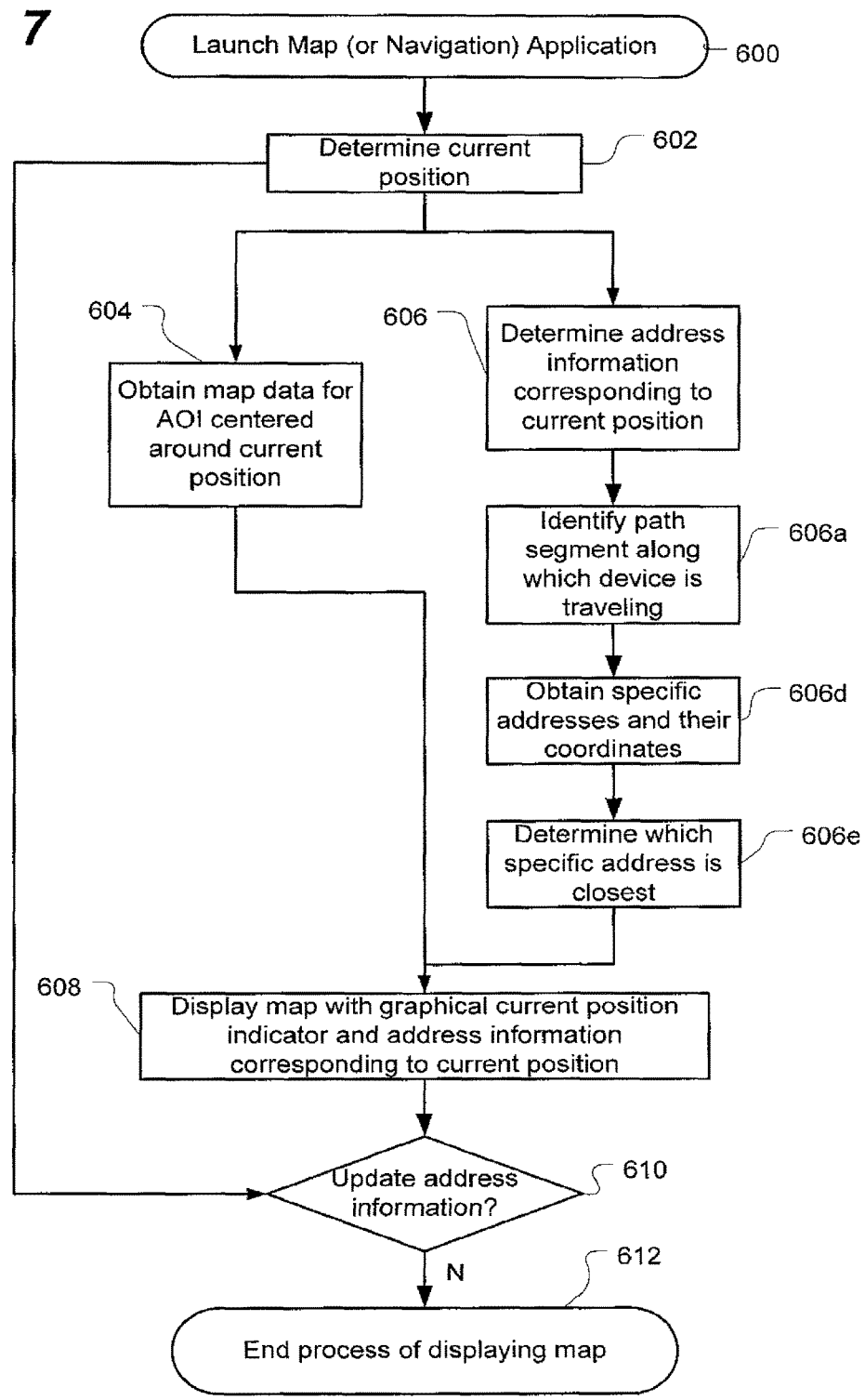
FIG. 7 is a flowchart presenting steps of a method of dynamically displaying address information on a map in accordance with a specific implementation in which the street address is determined by computing distances to stored addresses having known coordinates of longitude and latitude.

FIG. 7 is a flowchart presenting steps of a method of dynamically displaying address information on a map in accordance with a specific implementation in which the street address is determined by computing distances to stored addresses having known coordinates of longitude and latitude. As will be noted, FIG. 7 is very similar to FIG. 5 except that a few additional steps have been added pertaining to the determination of address information. In particular, the method of FIG. 7 includes (as did the method of FIG. 6) a step 606a of identifying a path segment along which the device is traveling based on the current position of the device. Furthermore, the method of FIG. 7 includes a step 606d of obtaining specific street addresses for the path segment along with corresponding coordinates of longitude and latitude for each of the specific street addresses along the path segment. Furthermore, the method of FIG. 7 includes a step 606e of determining which of the specific street addresses is closest to the current position of the device.

Figure 9:
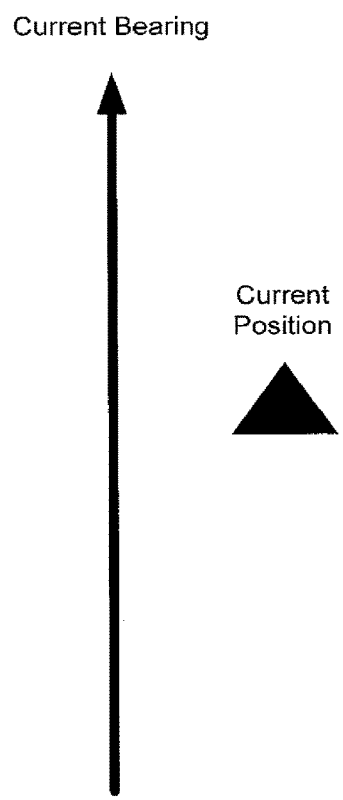
FIG. 9 schematically depicts a technique for computing distances to specific stored addresses by taking in account the bearing of the device to thereby ignore addresses behind the device.

Optionally, the method of FIG. 7 can be refined by modifying the step of determining which of the street addresses is closest. This step is modified by first determining a bearing of the device representing a direction of travel of the device along the path segment and then determining the closest specific street address to the current position by only computing distances to specific street addresses adjacent to or ahead of the current position while ignoring specific street addresses that lie behind the device. This is depicted schematically in FIG. 9 which shows the current position and current bearing (direction of travel). If the bearing is known, then only those addresses that lie beside or ahead of the current position need be checked. The addresses that lie behind the current position need not be checked. Of course, if the bearing is unknown, then all addresses in the list of addresses for the given path segment need to be checked.

Figure 10:
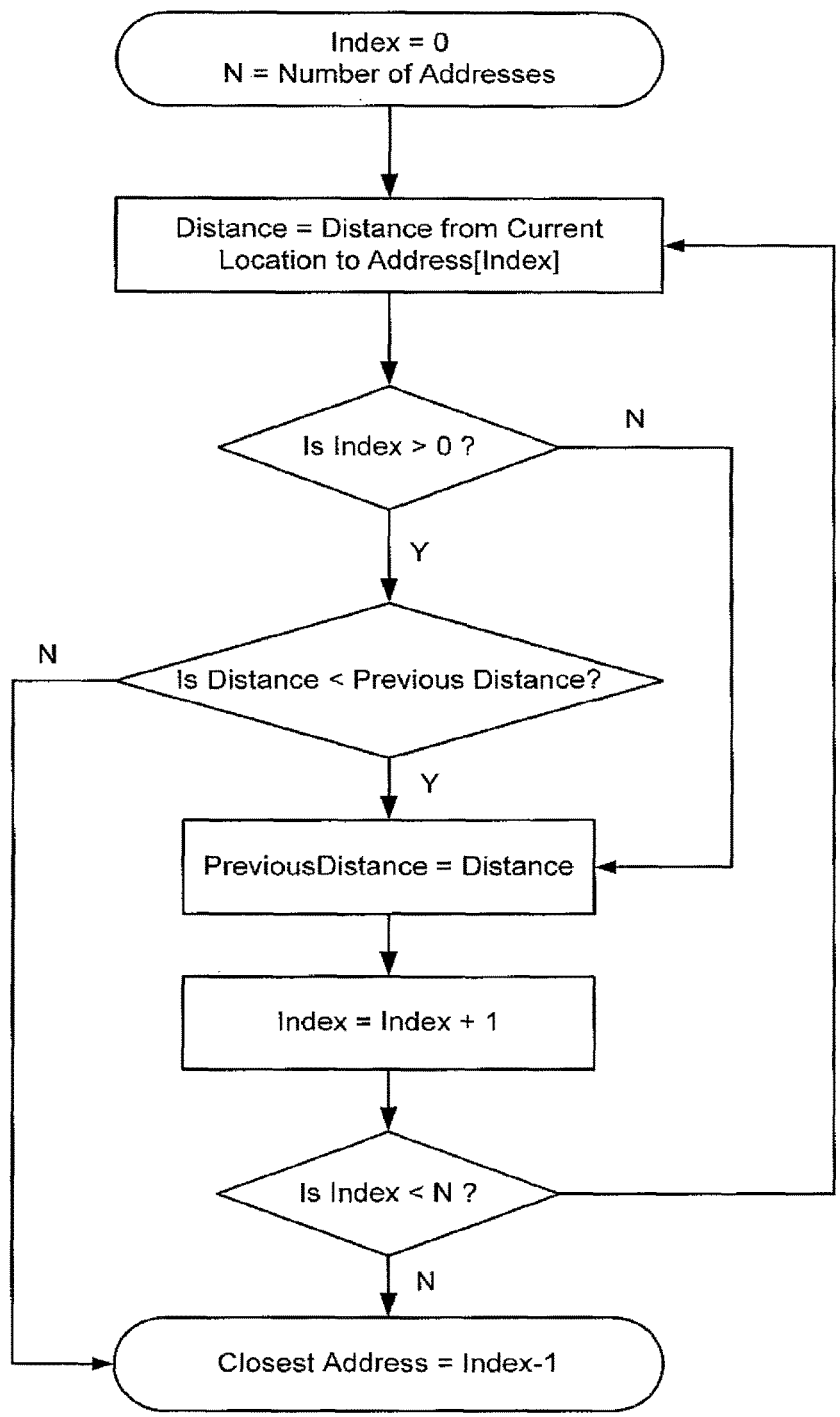
FIG. 10 is a flowchart depicting an algorithm for determining which address is closest to the current position.

FIG. 10 is a flowchart depicting steps of an algorithm for determining which address is closest to the current position.

As shown in this flowchart, for an index of N addresses along a path segment, distances from the current location the addresses along the path segment are checked until the minimum distance is found, thus representing the address closest to the current position. For the purposes of this specification, the expression "path segment" means either an entire street or roadway or a segment of a street or roadway, such as for example, a portion of a street along one particular block or a portion of a roadway between two (arbitrarily selected) cross streets. All available addresses for which coordinate data is stored are checked along the path segment even if, for example, the data is incomplete. An approximation can still be made even if some of the addresses or their respective coordinate data are unavailable. The device could, for example, provide some graphical indication to the user in those cases where the address interpolation or address determination is based on data that is known to be faulty or incomplete. For example, the street number could be rendered in a different color, font or with a different background shade (such as, for example, a cautionary yellow or red).

The foregoing method steps can be implemented as coded instructions in a computer program product. In other words, the computer program product is a computer-readable medium upon which software code is recorded to perform the foregoing steps when the computer program product is loaded into memory and executed on the microprocessor of the wireless communications device.

FIGS. 11 to 14 present four specific examples of maps showing the dynamically updatable address information that, in these examples, are presented visually in the form of street numbers in rectangular boxes. These examples are merely illustrative and are not meant to limit the manner in which address information can be presented. For example, in addition to the street numbers, it would also be possible to include the street name with the street number, e.g. 47 First Avenue as a floating box or bubble beside (or otherwise graphically linked to the graphical current position indicator). Alternatively, as alluded to previously, the address information can be presented in a dedicated box in a location onscreen that is away from the current position indicator. In yet another option, the address information can periodically appear and disappear (i.e. blink on and off). In yet another option, the address information can be manually activated or even voice-activated at the user's request (so that the numbers appear and disappear at the user's wish).

Figure 11:
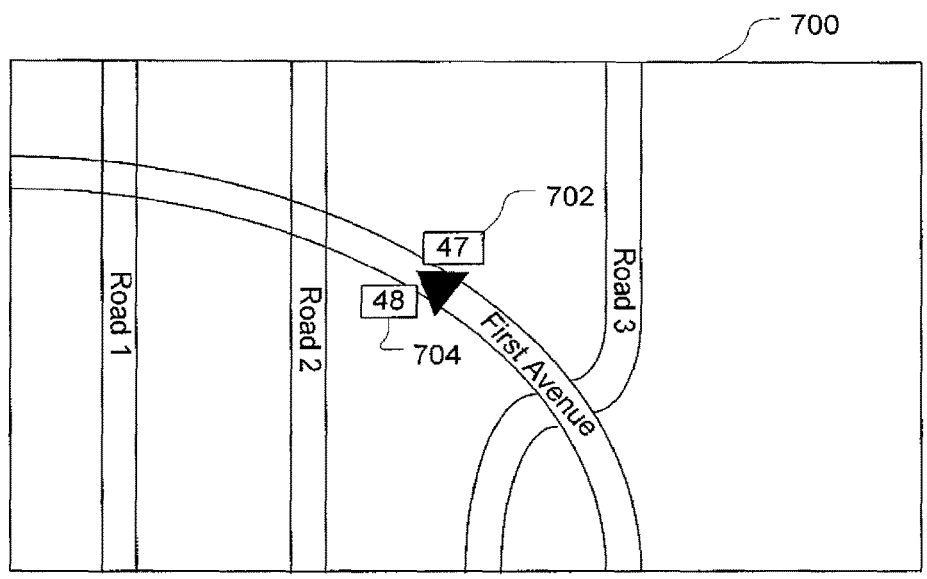
FIG. 11 is a schematic depiction of a map showing address information in the form of boxed street numbers on each side of a triangular graphical current position indicator.

FIG. 11 is a schematic depiction of a map 700 showing address information in the form of boxed street numbers on each side of a triangular graphical current position indicator. The boxed numbers 47 and 48 (which are identified with reference numerals 702 and 704, respectively) represent (by way of example) the street numbers of the addresses of the dwellings or buildings on each side of the current position of the device.

Figure 12:
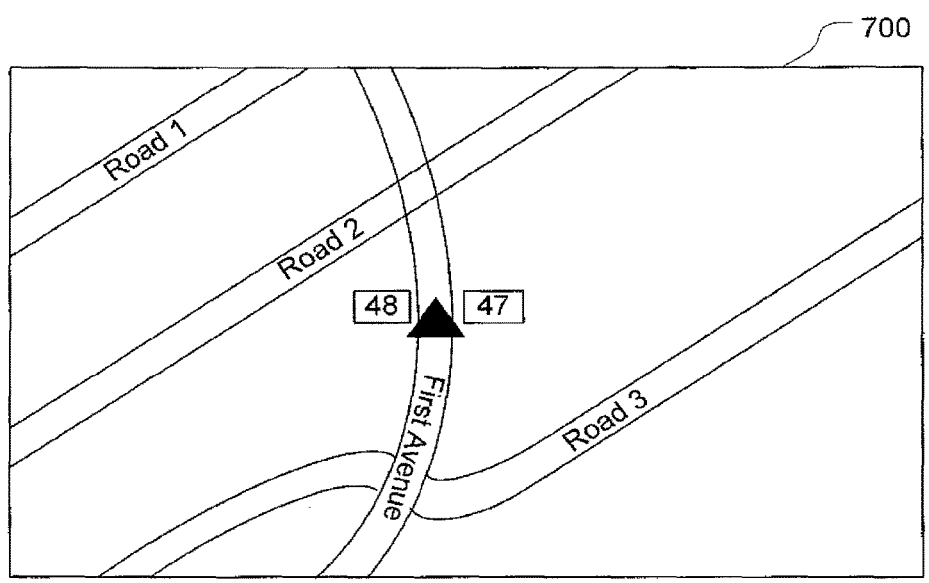
FIG. 12 is a schematic depiction of the same map shown in FIG. 11 but where the map has been rendered in track-up mode.

FIG. 12 is a schematic depiction of the same map 700 shown in FIG. 11 but where the map has been rendered in track-up mode. In track-up mode, the navigation software dynamically (and automatically) reorients the map so that the direction of travel is pointing straight upwards.

Figure 13:
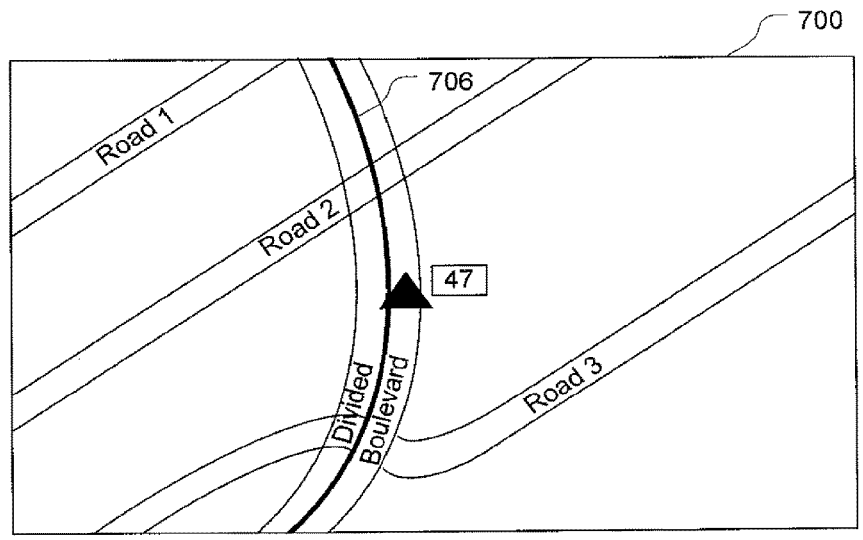
FIG. 13 is a schematic depiction of a map on which only a single street number is displayed because the path segment along which the device is traveling is a divided boulevard.

FIG. 13 is a schematic depiction of a modified map 700 on which only a single street number is displayed because the path segment along which the device is traveling is a divided boulevard 706 (i.e. a roadway with a solid median that traffic cannot cross). In that case, since access to the dwellings/buildings on the other side of the roadway is not possible, at least not along that particular segment) the navigation software simply presents the one municipal address (civic address), i.e. only the street number 47 is displayed on the right side of the position indicator.

Figure 14:
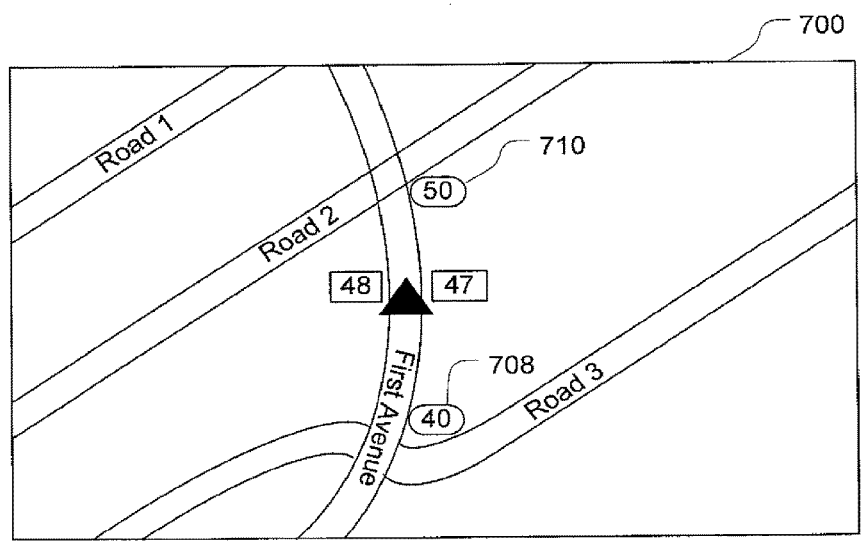
FIG. 14 is a schematic depiction of a map on which a pair of odd and even street numbers are shown on each side of the graphical current position indicator, and further showing an address range for the particular path segment.

FIG. 14 is a schematic depiction of map 700 on which a pair of odd and even street numbers are shown on each side of the graphical current position indicator, as was done in FIGS. and 12, but further showing an address range for the particular path segment. In this example, the address at the intersection of First Avenue and Road 3 is 40 (i.e. 40 First Avenue) while the civic address at the intersection of Road 2 is 50 (i.e. 50 First Avenue). In this example, these address "limits" (representing the address range for that block or path segment along First Avenue between Roads 2 and 3) are presented as the civic addresses (40 and 50 within oval-shaped frames). As will be readily appreciated, the address range can be presented in many other formats, and the illustration of FIG. 14 is merely presented as one example.

Figure 15:
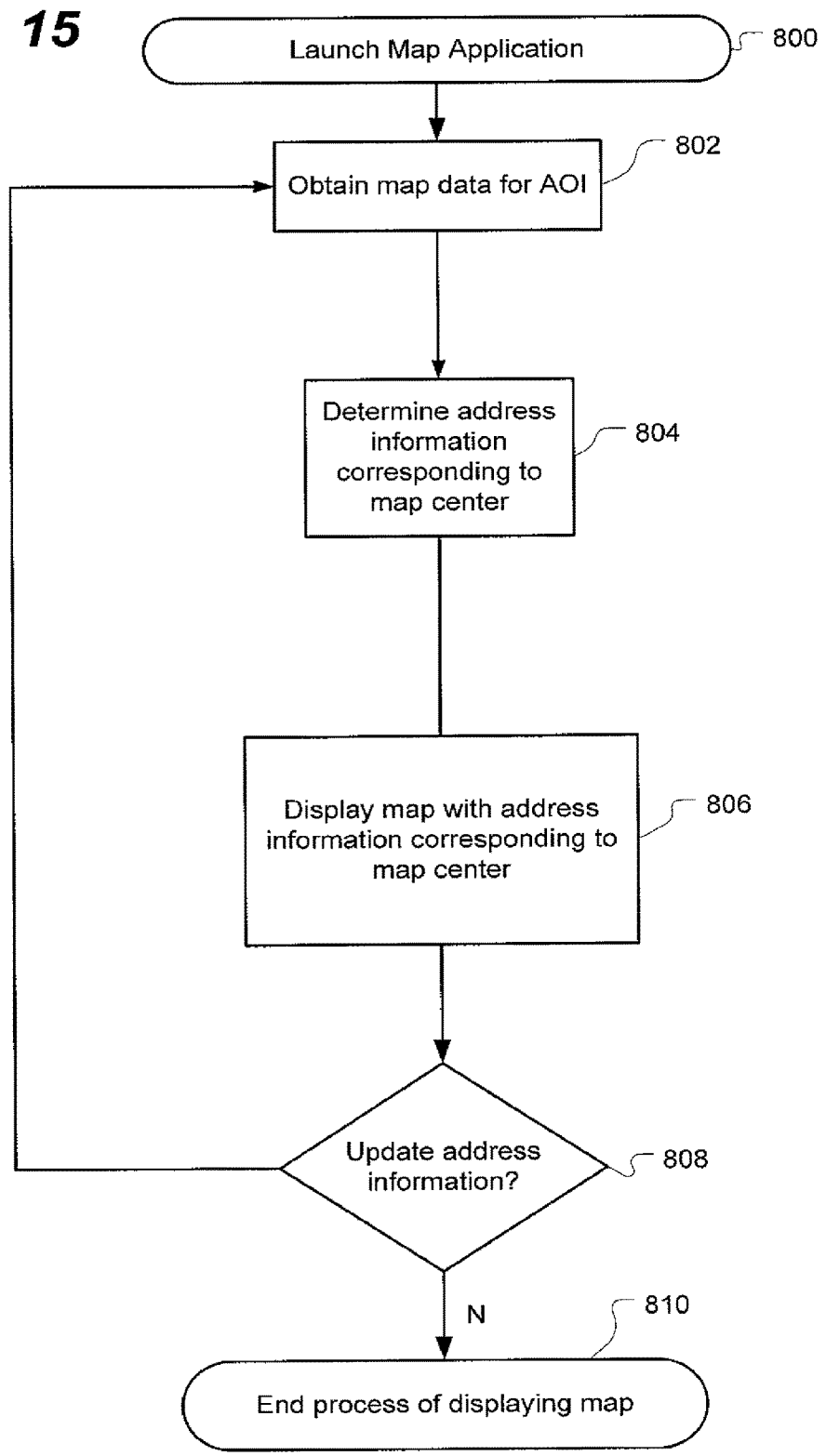
FIG. 15 is a flowchart showing steps of a method of displaying address information for the center of a map in accordance with another implementation of the present technology.

FIG. 15 is a flowchart showing steps of a method of displaying address information on a map where the address information corresponds to the center of the map rather than to a GPS-determined current position fix. As depicted in FIG. 15, after launching the map application at step 800, this particular method involves obtaining map data for a given area of interest (AOI) at step 802, determining address information for the map center of the AOI (step 804), and then displaying the map with address information corresponding to the map center 806. Preferably, the address information displayed is the street number for each side of the street closest to the map center. As the map is panned or scrolled, the address information is dynamically updated. At step 808 of the method, a determination is made as to whether updated address information is needed. If so, new map data is obtained for the revised AOI. Otherwise, at step 810, operations terminate, if only temporarily. In the particular implementation depicted in FIG. 15, the step of identifying the position on the map entails identifying a center of the map displayed onscreen. This can be determined by computing the geographical center of the bounding box representing the AOI, and can be dynamically updated as the map is panned or scrolled into new areas.

As will be recalled, in the implementations of this technology described with respect to FIGS. 4-14, the step of identifying the position of the map entails receiving current position information representing a current position of the wireless communications device, e.g. determining the current position using GPS. Thus, the two general implementations of this technology (dynamically displaying address information for the map center or current position) can be summarized as including steps of identifying a position on the map (either a map center or a current position), determining address information corresponding to the position displayed on the wireless communications device, and presenting the address information to a user of the device.

This new technology has been described in terms of specific implementations and configurations (and variants thereof) which are intended to be exemplary only. The scope of the exclusive right sought by the applicant is therefore intended to be limited solely by the appended claims.

The invention claimed is:
1. A method of displaying a map on a wireless communications device, the method comprising:
 determining position information of a position on the map;
 displaying, via a user interface of the device, a graphical position indicator representing the position on the map;
 determining address information corresponding to the position on the map, the address information compris- ing at least one street number, each street number denoting, a respective location; and for each said at least one street number:

determining whether the location denoted by the street number is accessible from the position on the map, wherein the position information comprises a path segment and determining whether the location is accessible comprises determining whether the path segment provides access to the location;

if the location is accessible from the path segment, displaying the street lumber adjacent to the graphical position indicator, and;

if the location is not accessible from the path segment, not displaying the street number.

2. The method of claim 1, wherein the path segment comprises a roadway segment, and the position information further comprises a side of the roadway segment for the position on the map.

3. The method of claim 2, wherein determining whether the location denoted by the street number is accessible comprises determining whether the location is accessible from the side of the roadway segment.

4. The method of claim 3, wherein determining whether the location is accessible from the side of the roadway segment comprises determining whether the roadway segment is crossable.

5. The method of claim 1, wherein the determining the address information comprises obtaining, from a server, address data containing the address information.

6. The method as claimed in claim 1 wherein determining the position information comprises identifying a center of the map displayed onscreen.

7. The method of claim 1, wherein the determining the position information comprises determining a current position of the wireless communications device.

8. The method of claim 7, wherein the address information comprises an address range for a path segment along which the wireless communications device is traveling.

9. A non-transitory computer readable medium comprising code which, when loaded into memory and executed on a processor of a device, causes the device to:

determine position information of a position on the map;

display, via a user interface of the device, a graphical position indicator representing the position on the map;

determine address information corresponding to the position on the map, the address information comprising at least one street number, each street number denoting a respective location; and for each said at least one street number:

determine whether the location denoted by the street number is accessible from the position on the map, wherein the position information comprises a path segment and determining whether the location is accessible comprises determining whether the path segment provides access to the location;

if the location is accessible from the path segment, display the street number adjacent to the graphical position indicator, and;

if the location is not accessible from the path segment, not display the street number.

10. The computer readable medium of claim 9, wherein the path segment comprises a roadway segment, and the position information further comprises a side of the roadway segment for the position on the map.

11. The computer readable medium of claim 10, wherein determining whether the location denoted by the street number is accessible comprises determining whether the location is accessible from the side of the roadway segment.

12. The computer readable medium of claim 11, wherein determining Whether the location is accessible from the side of the roadway segment comprises determining whether the roadway segment is crossable.

13. A device comprising:

a display for displaying a map; and a processor operatively coupled to memory configured to cause the device to:

determine position information of a position on the map;

display, via a user interface of the device, a graphical position indicator representing the position on the map;

determine address information corresponding to the position on the map, the address information comprising at least one street number, each street number denoting a respective location; and for each said at least one street number:

determine whether the location denoted by the street number is accessible from the position on the map, wherein the position information comprises a path segment and determining whether the location is accessible comprises determining whether the path segment provides access to the location;

if the location is accessible from the path segment, display the respective street numbers adjacent to the graphical position indicator, and;

if the location is not accessible from the path segment, not display the respective street number.

14. The device of claim 13, wherein the path segment comprises a roadway segment, and the position information further comprises a side of the roadway segment for the position on the map.

15. The device of claim 14, wherein determining whether the location denoted by the street number is accessible comprises determining whether the location is accessible from the side of the roadway segment.

16. The device of claim 15, wherein determining whether the location is accessible from the side of the roadway segment comprises determining whether the roadway segment is crossable.

17. The device of claim 13, wherein the determining the address information comprises obtaining, from a server, address data containing the address information.

* * * * *

UNITED STATES PATENT AND TRADEMARK OFFICE
CERTIFICATE OF CORRECTION

PATENT NO. : 9,857,180 B2
APPLICATION NO. : 15/237215
DATED : January 2, 2018
INVENTOR(S) : Ronald Anthony Dicke Page 1 of 1

It is certified that error appears in the above-identified patent and that said Letters Patent is hereby corrected as shown below:

- In Claim 1, Column 21, Line 2, the "," between the words "denoting" and "a respective" is deleted.

- In Claim 12, Column 22, Line 14, the word "Whether" is amended to read "whether".

Signed and Sealed this
Tenth Day of April, 2018

Andrei Iancu
*Director of the United States Patent and Trademark Office*